(12) United States Patent
Ojha

(10) Patent No.: US 11,741,163 B2
(45) Date of Patent: Aug. 29, 2023

(54) MAPPING OF PERSONALLY-IDENTIFIABLE INFORMATION TO A PERSON BASED ON NATURAL LANGUAGE COREFERENCE RESOLUTION

(71) Applicant: Box, Inc., Redwood City, CA (US)

(72) Inventor: Alok Ojha, Newark, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 17/334,420

(22) Filed: May 28, 2021

(65) Prior Publication Data

US 2022/0083604 A1 Mar. 17, 2022

Related U.S. Application Data

(60) Provisional application No. 62/706,861, filed on Sep. 14, 2020, provisional application No. 62/706,868, filed on Sep. 14, 2020.

(51) Int. Cl.
| | |
|---|---|
| *G06F 16/903* | (2019.01) |
| *G06F 16/901* | (2019.01) |
| *G06F 16/906* | (2019.01) |
| *G06F 40/20* | (2020.01) |
| *H04L 61/4523* | (2022.01) |

(52) U.S. Cl.
CPC ...... *G06F 16/90335* (2019.01); *G06F 16/906* (2019.01); *G06F 16/9024* (2019.01); *G06F 40/20* (2020.01); *H04L 61/4523* (2022.05)

(58) Field of Classification Search
None
See application file for complete search history.

(56) References Cited

U.S. PATENT DOCUMENTS 9,535,902 B1 * 1/2017 Michalak ............ G06F 16/3331
10,216,811 B1 * 2/2019 Mark ....................... G06F 16/25
(Continued)

OTHER PUBLICATIONS

"LDAP." Computer Desktop Encyclopedia. 1981-2019. The Computer Language Company Inc. Accessed Jun. 8, 2022 from https://www.computerlanguage.com/results.php?definition=LDAP (Year: 2019).*
(Continued)

*Primary Examiner* — Alex Gofman
*Assistant Examiner* — Umar Mian
(74) *Attorney, Agent, or Firm* — Vista IP Law Group, LLP

(57) ABSTRACT

Various corpora of content objects and other information sources beyond the corpora of content objects are processed to identify personally identifiable information (PII). PII that is associated with a named person is codified into a first portion of a graph-oriented data structure. Also, PII that is associated with an alias that might refer to a named person is codified into a second portion of the graph-oriented data structure. A determination is made that the alias that might refer to a named person is indeed an alias that is a coreference to the named person. Based on that determination then, since the first portion of the graph and the second portion of the graph refer to the same person, then the PII of the second portion of the graph can be deemed to be PII of the same person. PII in common and/or language processing can be used to establish coreferences.

20 Claims, 27 Drawing Sheets

(56) References Cited

U.S. PATENT DOCUMENTS

| | | | |
|---|---|---|---|
| 2014/0156567 A1* | 6/2014 | Scholtes | G06N 5/02 |
| | | | 706/12 |
| 2019/0065977 A1* | 2/2019 | Xu | H04L 67/306 |
| 2019/0213354 A1* | 7/2019 | Bhowan | G06N 20/00 |
| 2019/0278777 A1* | 9/2019 | Malik | G06F 16/9024 |
| 2020/0250139 A1* | 8/2020 | Muffat | G06K 9/6264 |
| 2021/0264056 A1* | 8/2021 | Irish | G06F 21/6245 |
| 2022/0038553 A1* | 2/2022 | Geffert | H04L 67/303 |

OTHER PUBLICATIONS

Zheng, J., et al., "Conference Resolution: A review of general methodologies and applications in the clinical domain," Journal of Biomedical Informatics, dated 2011.

Winge, J., "Pronominal Anaphora Resolution in NLP," Semantic analysis, dated 2013.

Non-Final Office Action dated Jun. 17, 2022 for related U.S. Appl. No. 17/334,440.

Final Office Action dated Apr. 17, 2023 for related U.S. Appl. No. 17/334,440.

* cited by examiner

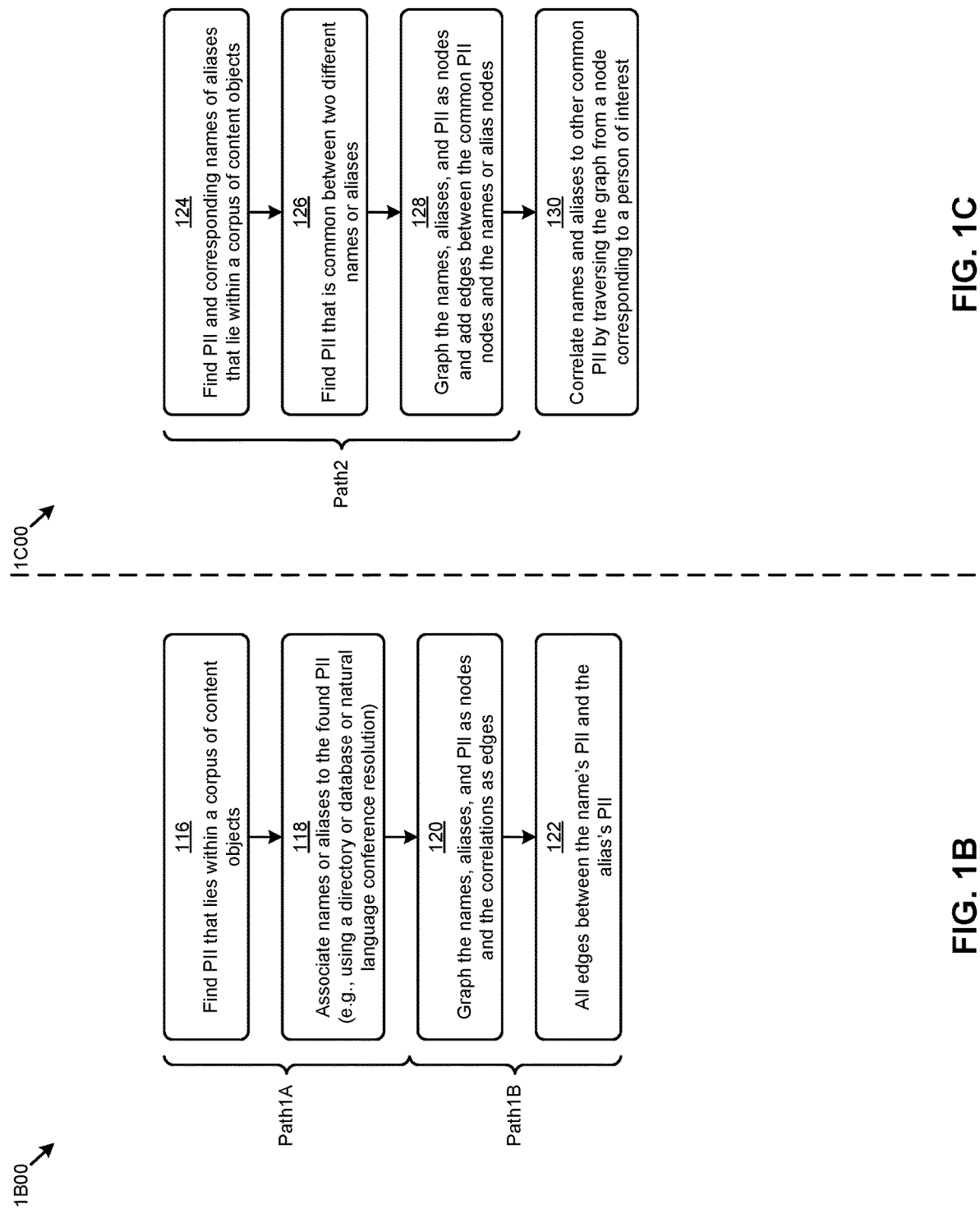

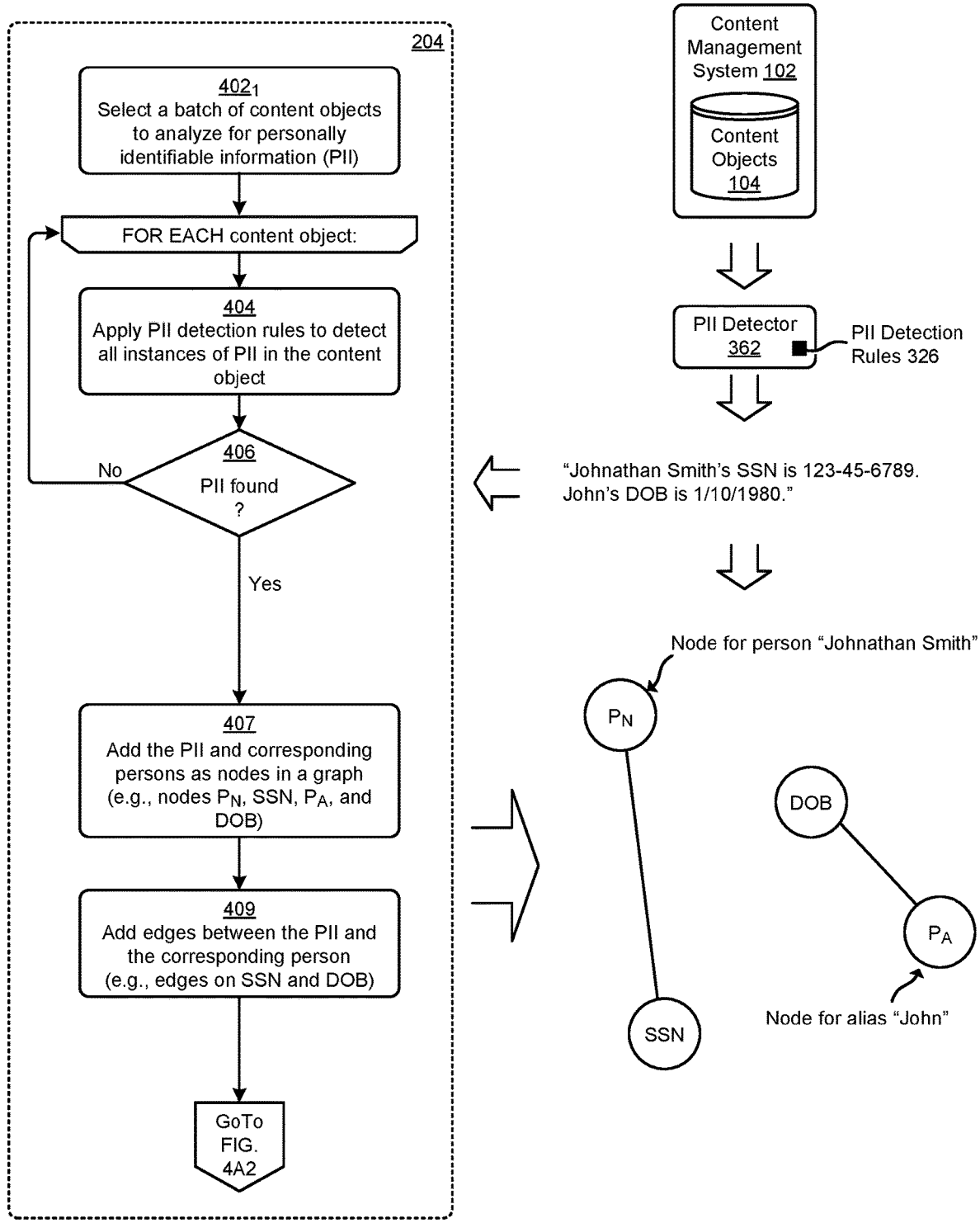
FIG. 4A1

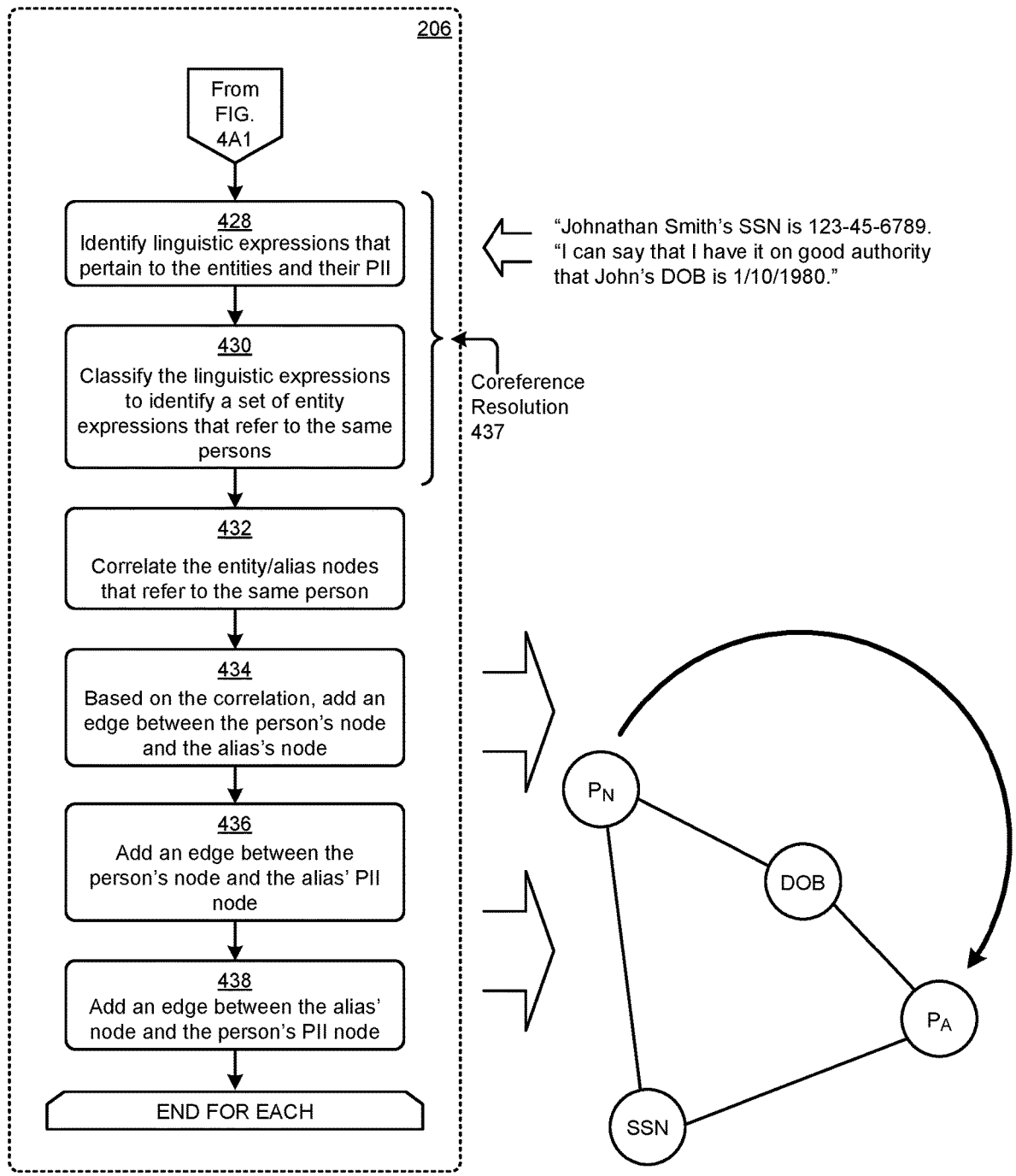
FIG. 4A2

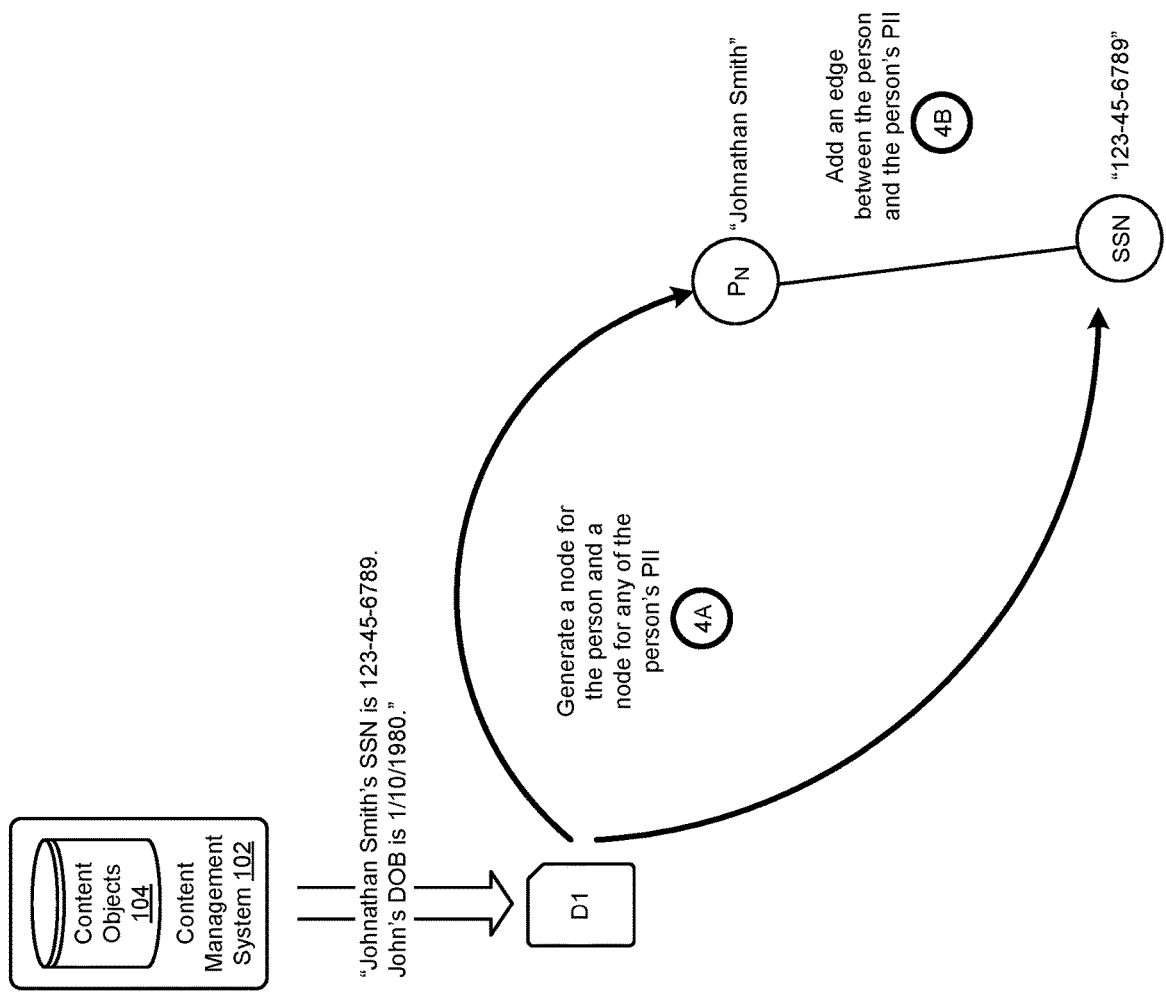
FIG. 4A3

FIG. 4A4

"Johnathan Smith's SSN is 123-45-6789. John's DOB is 1/10/1980."

D1

4C Generate a node for an alias and a node for the alias' PII

P_A "John's"

"1/10/1980" DOB

4D Add the edges between the alias and the alias' PII

P_N — SSN

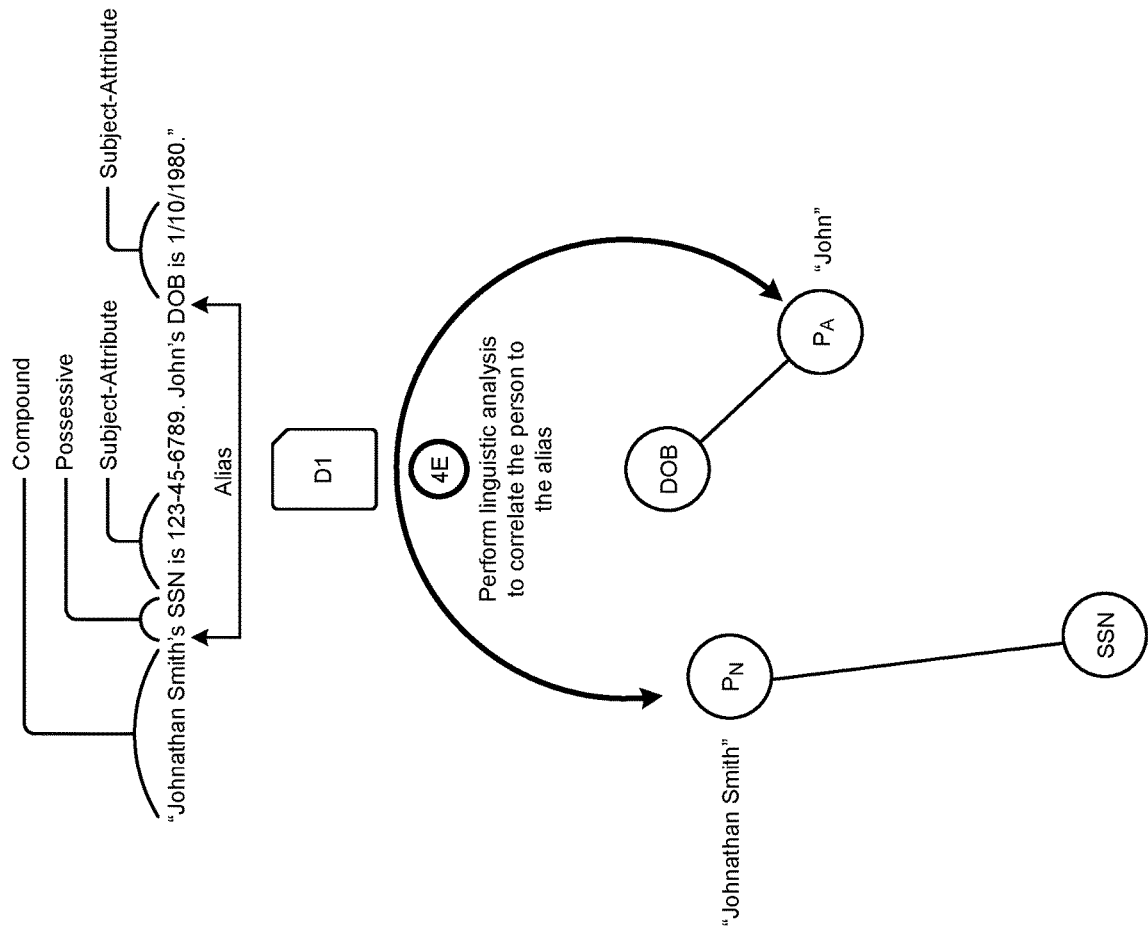
FIG. 4A5

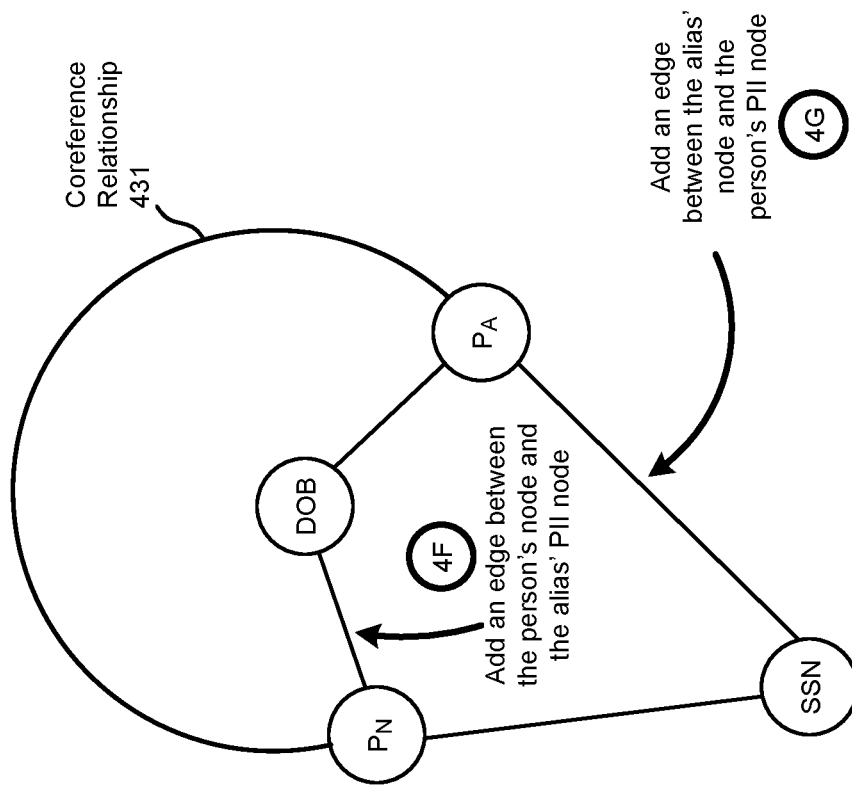
FIG. 4A6

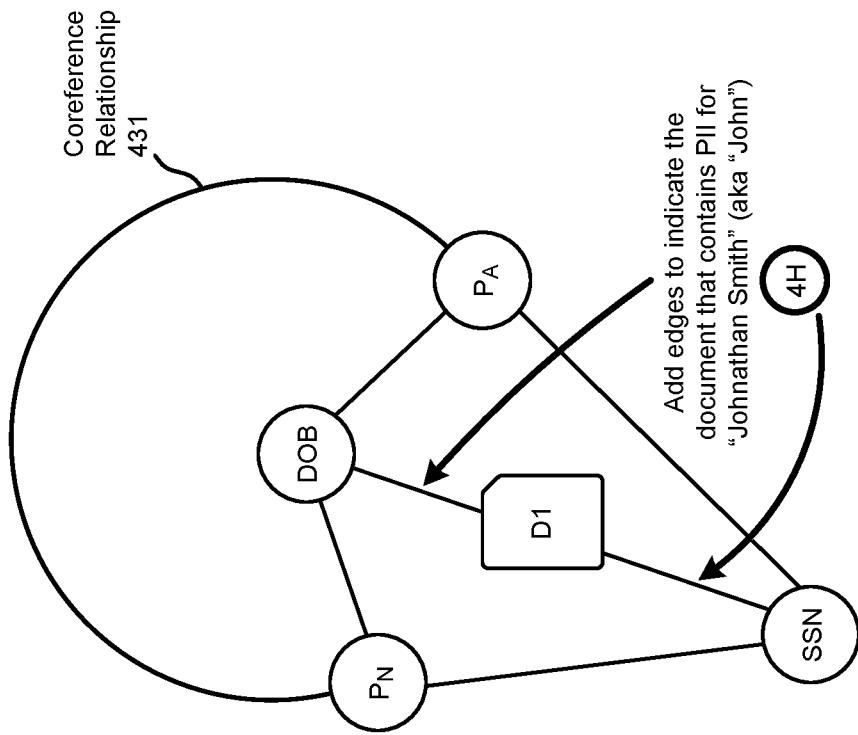
FIG. 4A7

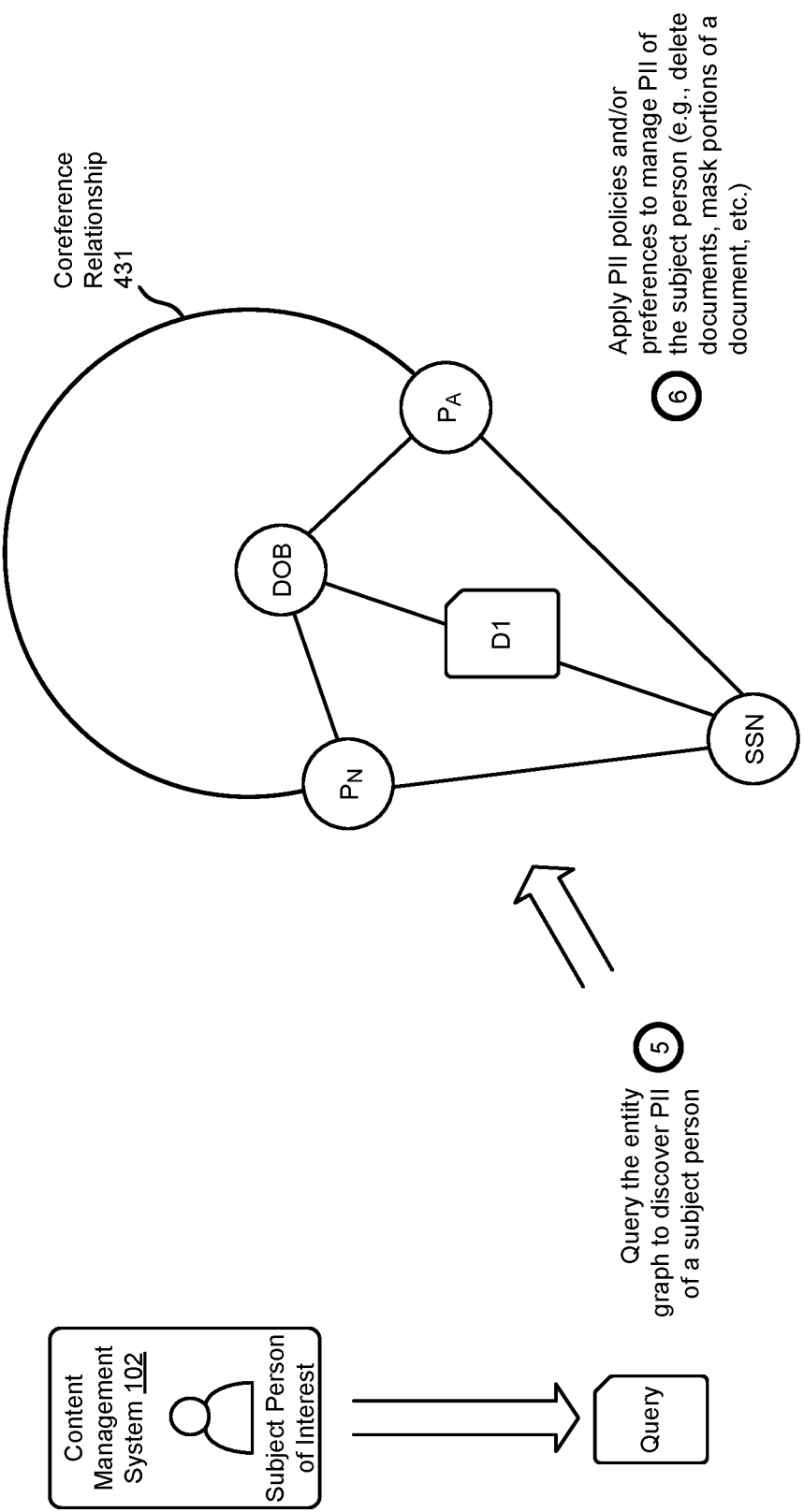
FIG. 4A8

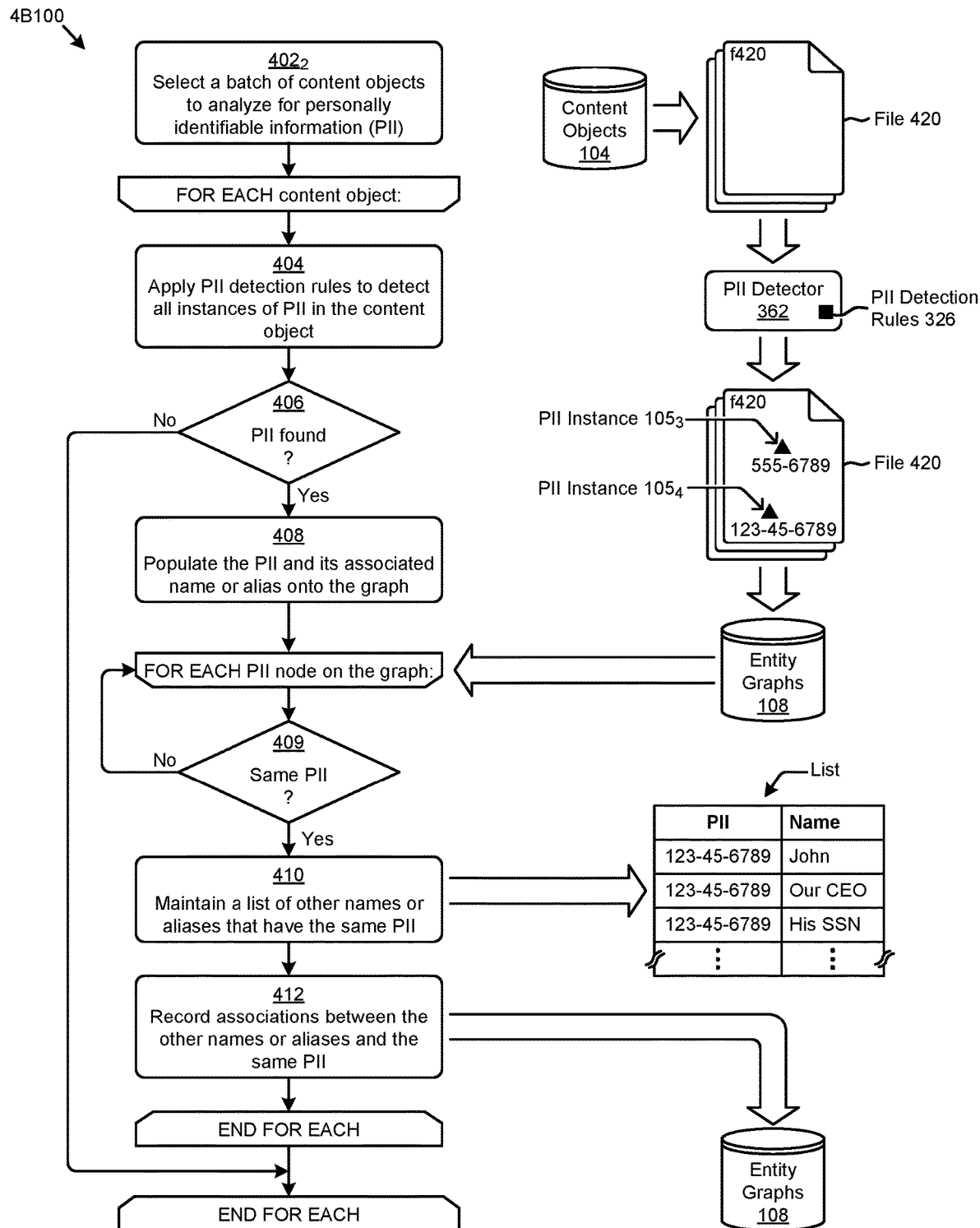
FIG. 4B1

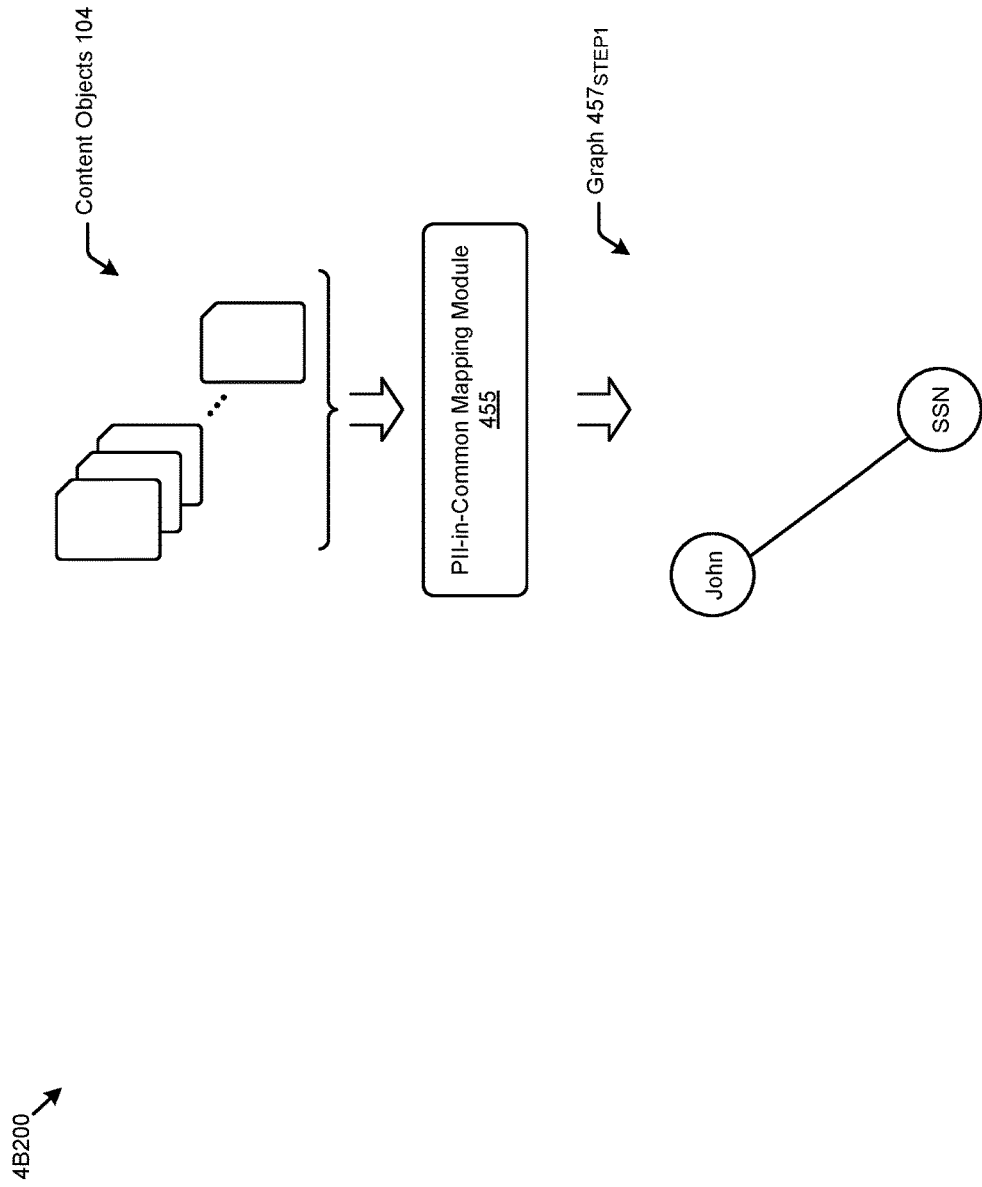
FIG. 4B2

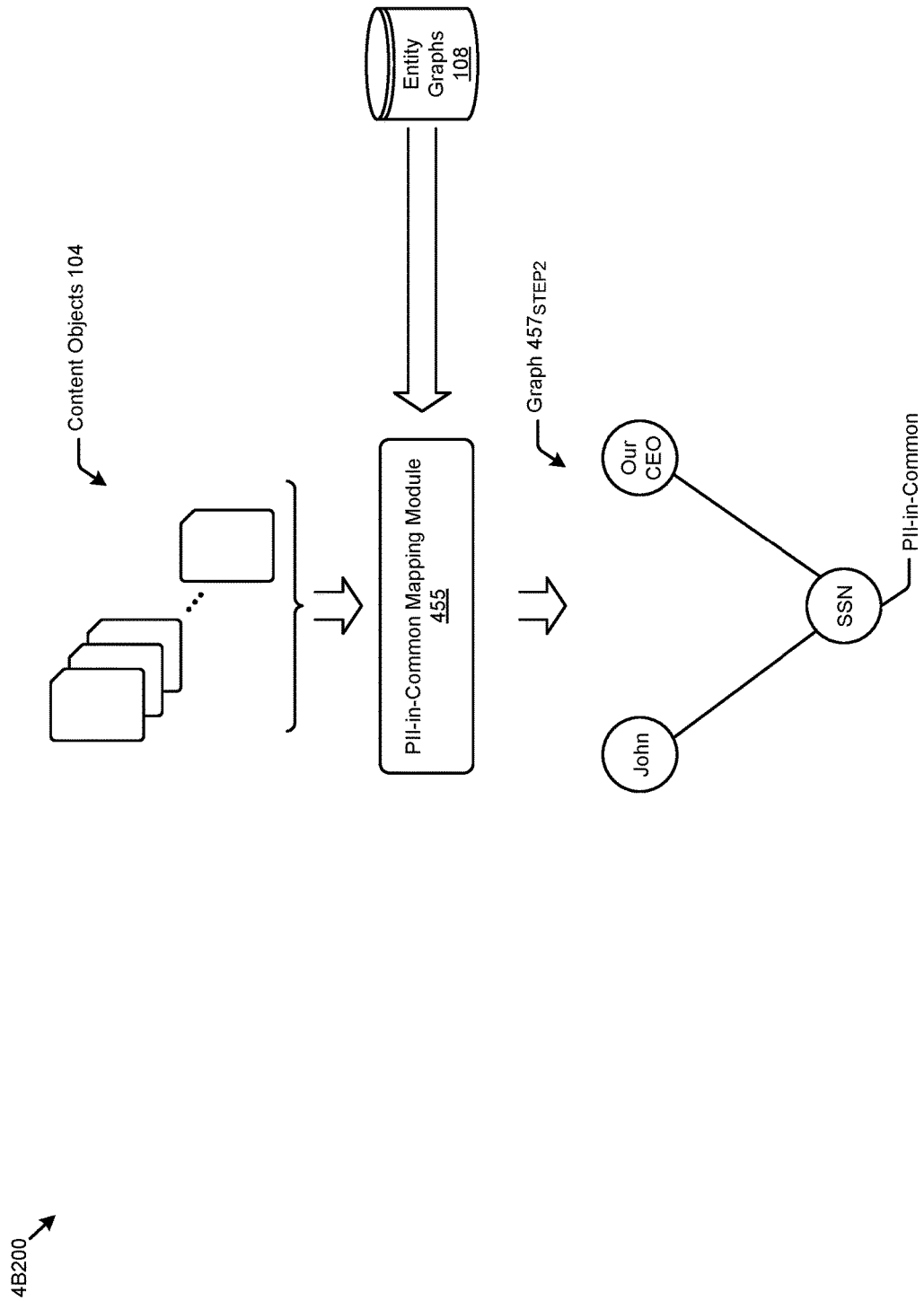
FIG. 4B3

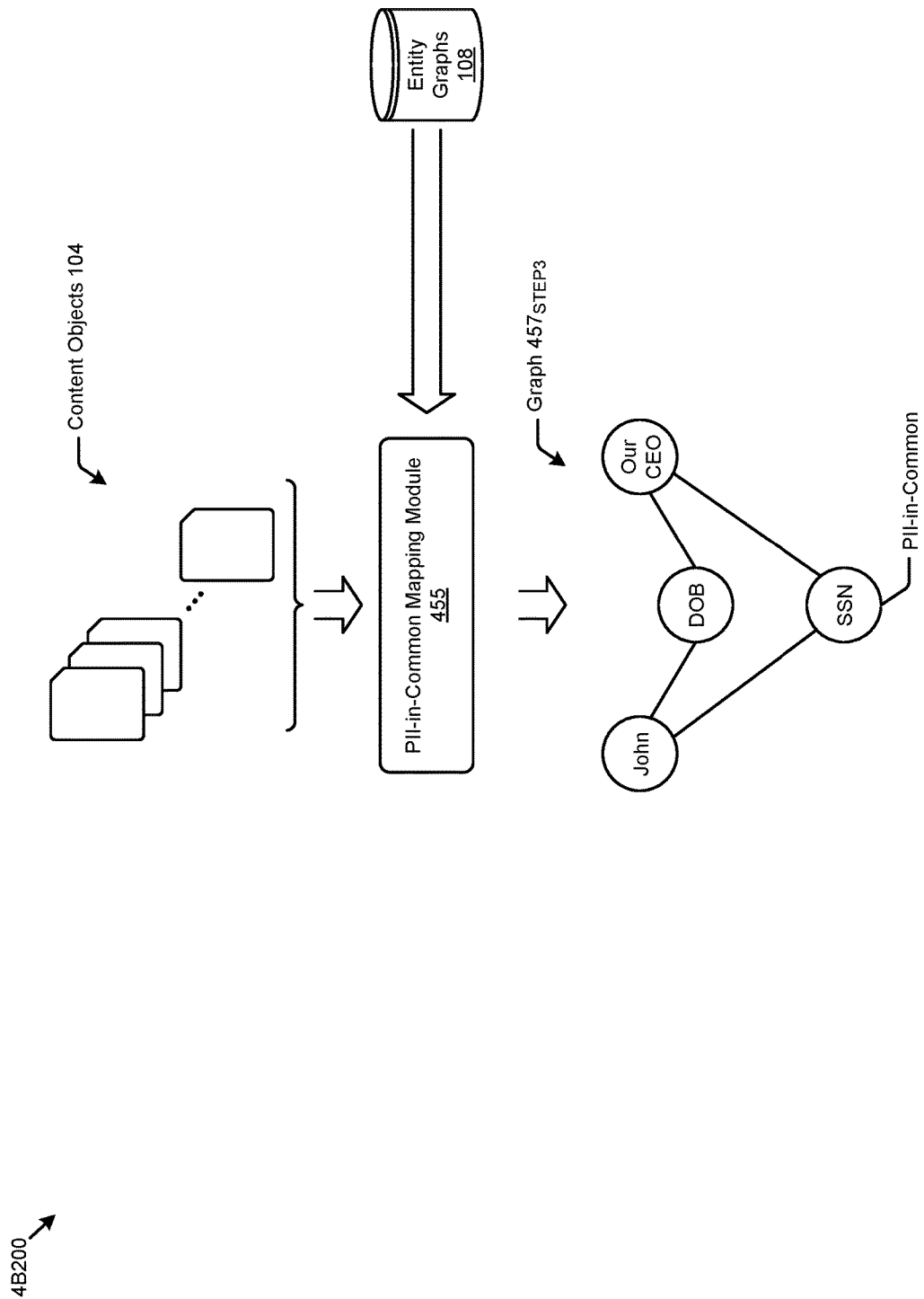
FIG. 4B4

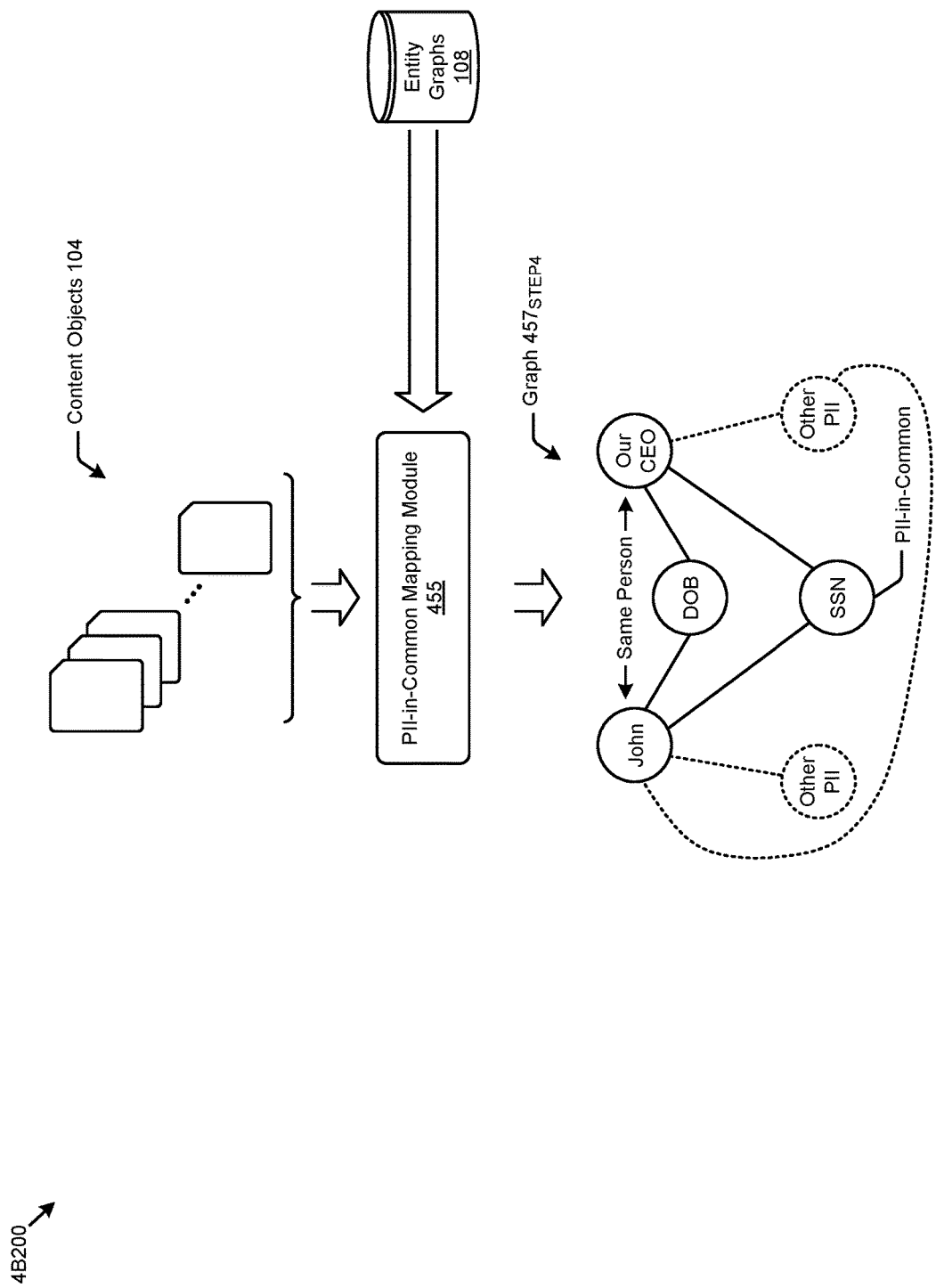
FIG. 4B5

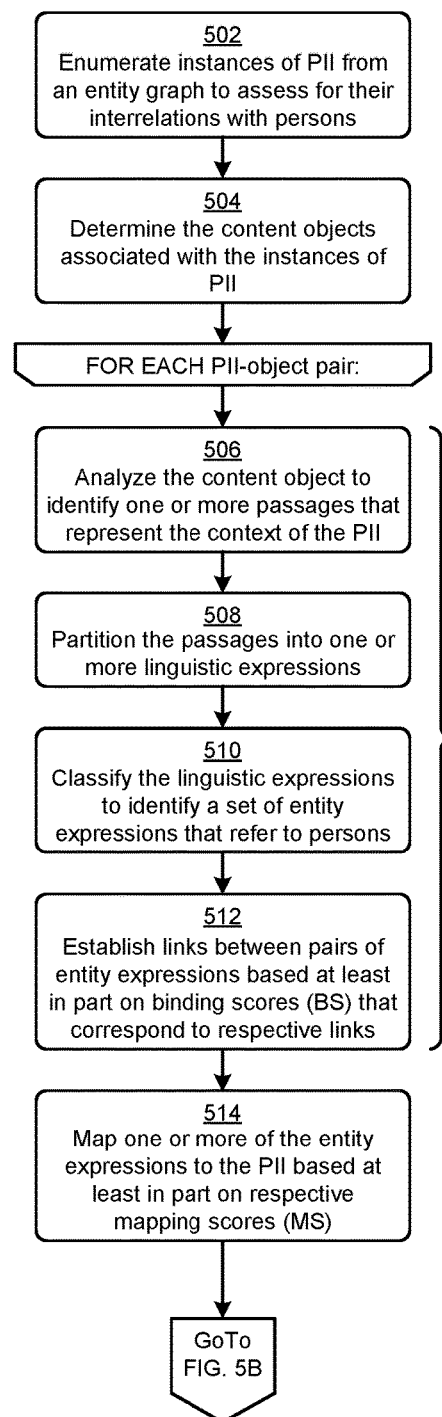
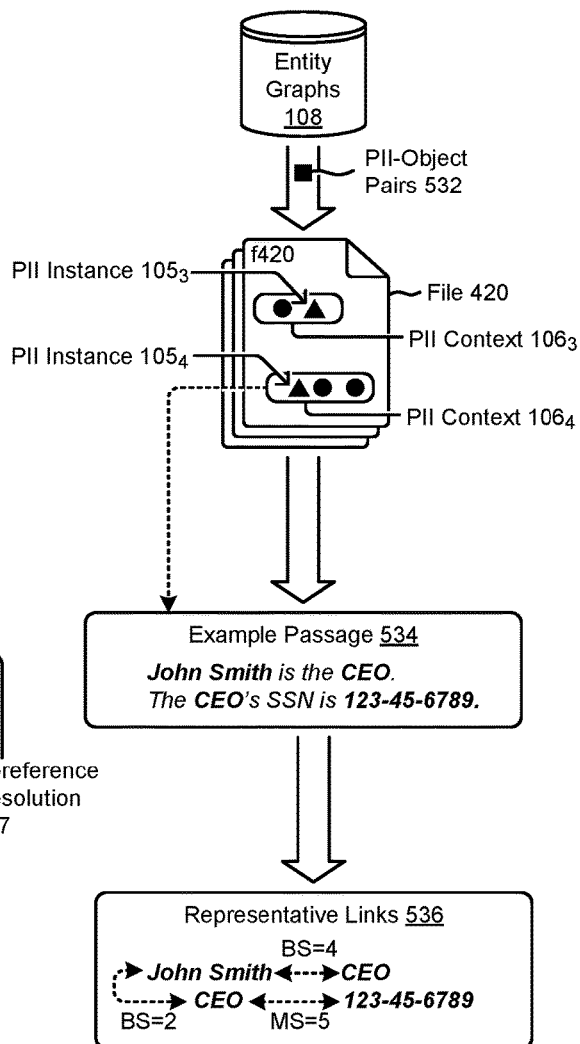
FIG. 5A

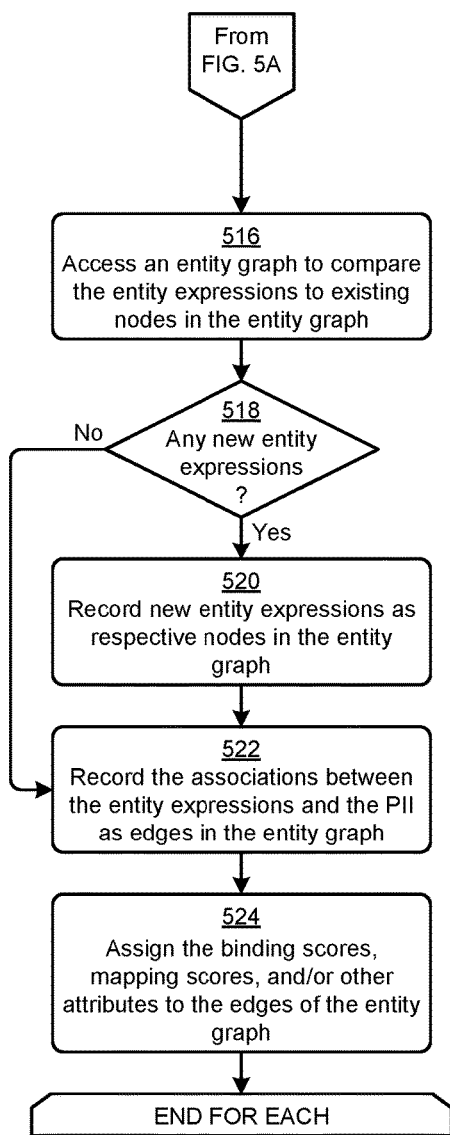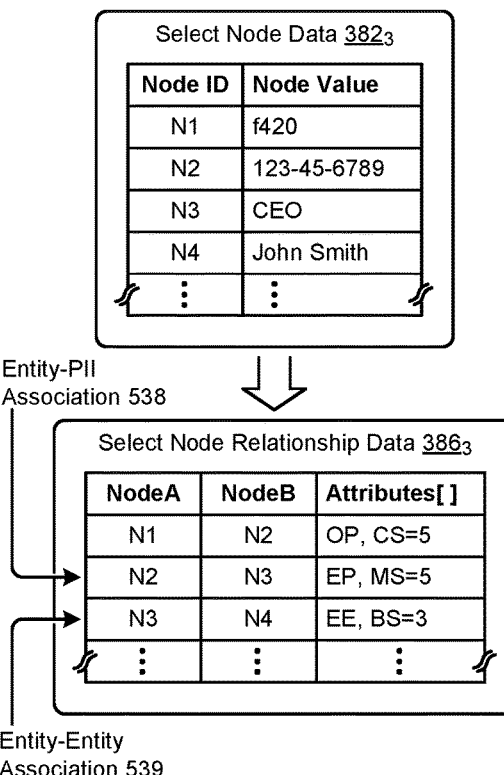
FIG. 5B

MAPPING OF PERSONALLY-IDENTIFIABLE INFORMATION TO A PERSON BASED ON NATURAL LANGUAGE COREFERENCE RESOLUTION

RELATED APPLICATIONS

The present application claims the benefit of priority to U.S. Provisional Patent Application Ser. No. 62/706,861 titled "COMPUTING INFRASTRUCTURE FOR GOVERNANCE AND COMPLIANCE", filed on Sep. 14, 2020, which is hereby incorporated by reference in its entirety; and the present application claims the benefit of priority to U.S. Provisional Patent Application Ser. No. 62/706,868 titled "DIGITAL SECURITY", filed on Sep. 14, 2020, which is hereby incorporated by reference in its entirety; and the present application is related to co-pending U.S. patent application Ser. No. 17/334,440 titled "MAPPING OF PERSONALLY-IDENTIFIABLE INFORMATION TO A PERSON BASED ON TRAVERSAL OF A GRAPH", filed on even date herewith, which is hereby incorporated by reference in its entirety.

TECHNICAL FIELD

This disclosure relates to content management systems, and more particularly to techniques for mapping personally-identifiable information to a person using coreference resolution.

BACKGROUND

Cloud-based content management services and systems have impacted the way personal and enterprise computer-readable content objects (e.g., files, documents, spreadsheets, images, programming code files, etc.) are stored, and have also impacted the way such personal and enterprise content objects are shared and managed. Content management systems provide the ability to securely share large volumes of content objects among trusted users (e.g., collaborators) on a variety of user devices, such as mobile phones, tablets, laptop computers, desktop computers, and/or other devices. Modern content management systems can host many thousands or, in some cases, millions of files for a particular enterprise that are shared by hundreds or thousands of users. To further promote collaboration over the users and content objects, content management systems often provide various user communication tools, such as instant messaging or "chat" services. These communications may also be saved to create additional content objects managed by the systems.

The foregoing content objects managed by the content management systems may include personally identifiable information (PII). The PII may be included in some content objects (e.g., social security numbers in tax forms) or may be extemporaneously embedded in other content objects (e.g., a contact phone number entered in a chat conversation). In many cases, neither the person nor even the candidate persons that are potentially associated with the PII in the content objects are necessarily known a priori. For example, the person associated with an instance of PII in a content object may or may not be a user of the content management system that manages the content object. Even with this as a backdrop, stewards of large volumes of electronic or computer-readable content objects (e.g., content management systems) must comply with the various laws, regulations, guidelines, and other types of governance that have been established to monitor and control the use and dissemination of personally identifiable information (PII) contained in the content objects.

In the United States, for example, the federal statutes known as the Security Rule of the Health Insurance Portability and Accountability Act (HIPAA) was established to protect a patient's PII while still allowing digital health ecosystem participants access to needed protected health information (PHI). As another example, the California Consumer Privacy Act (CCPA) is a state statute intended to enhance privacy rights and consumer protection to California state residents. As another example, the European Parliament has enacted a series of legislation such as the General Data Protection Regulation (GDPR) to limit the distribution and accessibility of PII. While the definition and specific governing rules of PII may vary by geography or jurisdiction, the common intent of such governance is to provide a mechanism for the owner of PII to control access and distribution of their personally identifiable information.

Unfortunately, there are no known techniques for identifying and controlling personally identifiable information embedded in large volumes of content objects. While certain approaches exist for identifying instances of PII in content objects, such approaches are limited in their ability to correlate that PII to specific people. Specifically, when the context surrounding an instance of PII does not explicitly identify a person associated with the PII, existing approaches are deficient in determining—with an acceptable level of confidence—who owns or is associated with the PII. What is needed is are ways to confidently and securely associate a particular instance of PII to a particular person. Furthermore, what is needed are techniques that address ongoing management of personally identifiable information that is embedded across arbitrary corpora of content objects.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

Disclosed herein are various techniques for determining that a particular set of personally identifiable (PII) information belongs to a subject entity—even when the PII is not explicitly or directly associated with the subject entity's name. Various of the disclosed techniques serve to identify aliases that are deemed to, at least potentially, refer to the subject entity. The PII of the aliases that are deemed to be aliases of the subject entity can thus be deemed to be PII of the subject entity.

Identification of aliases of a subject entity can be carried out by processing a corpus of content objects to (1) identify a first set of personally identifiable information associated with a name or alias and (2) to identify a second set of personally identifiable information associated with another name or alias. The first set of personally identifiable information associated with the name or alias is codified in a first portion of a graph. Similarly, the second set of personally identifiable information is codified in a second portion of the graph. Upon a determination that the identified names and/or aliases refer to the same person, then the first portion of the graph and the second portion of the graph are deemed to be associated with each other. Since those two portions of the graph refer to the same person (e.g., the subject entity), then the graph can be queried and traversed so as to recognize that both the first set of personally identifiable information as well as the second set of personally identifiable information belong to the same person.

As can be seen, the second set of personally identifiable information can be deemed to be PII of the subject entity, even though the information that is used to form the second portion of the graph does not explicitly identify by name the person associated with the PII. In some embodiments, the determination that a first identified name or alias and a second identified alias refer to the same person can be made on the basis that the first identified name or alias and the second identified alias share PII in common. For example, given the phrase, "Johnathan Smith has a social security number of 123-45-6789", and given the phrase, "John's social security number is 123-45-6789", then "Johnathan Smith" and that occurrence of the alias "John's" can be deemed to refer to the same person.

In some embodiments, the determination that a name and an alias refer to the same person can be made on the basis of linguistic analysis (e.g., by identifying and analyzing pronominal anaphoric references) to determine that the alias is referring to the same person who is identified by name.

Some of the techniques used in the disclosed systems, methods, and computer program products for mapping personally-identifiable information to a person using natural language coreference resolution rely on natural language processing techniques that advance the relevant technologies over legacy approaches.

The disclosed embodiments modify and improve over legacy approaches. In particular, the herein-disclosed techniques provide technical solutions that address the technical problems attendant to managing personally identifiable information pertaining to known and unknown persons that is embedded across arbitrary corpora of content objects. Such technical solutions involve specific implementations (i.e., data organization, data communication paths, module-to-module interrelationships, etc.) that relate to the software arts.

The embodiments disclosed herein improve to the way a computer stores and retrieves data through implementation of specific graph-oriented data structures. These specific graph-oriented data structures overcome challenges with processing large corpora of content objects. To illustrate, to identify a named person and that named person's alias that may be disparately distributed over a large corpus of content objects (e.g., terabytes or more) would require a virtual or real memory space to contain all of the content of the content objects, or would require making multiple passes over the corpora of content objects. In contrast, when the specific graph-oriented data structures as disclosed herein are employed, the amount of virtual or real memory needed is reduced by an order of magnitude.

Still further, when forming these aforementioned graph-oriented data structures, an index can be constructed such that graph nodes that correspond to all names, and/or suspected names and all aliases and/or suspected aliases, and/or all PII entries are identified directly in the index. As such, and based on a given name or alias that is used to query over the index, the graph can then be accessed directly, starting from a particular node as determined from the results of the query over the index. As such, the only portions of the graph that need to be traversed are those portions that are directly or indirectly connected to the identified node. This results in a decrease in the amount of memory needed, a decrease in the amount of computer processor cycles needed and, in some cases results in a decrease in network bandwidth demanded when processing large graph-oriented data structures.

The ordered combination of steps of the embodiments serve in the context of practical applications that perform steps for mapping persons to respective PII discovered over a corpus of content objects by automatically correlating the PII to coreferenced entities contained in the context associated with the personally identifiable information. These techniques for mapping persons to respective PII discovered over a corpus of content objects by correlating the PII to coreferenced entities contained in the context associated with the personally identifiable information overcome long standing yet heretofore unsolved technological problems associated with managing personally identifiable information that is embedded across arbitrary corpora of computer-accessible content objects.

The herein-disclosed embodiments are technological solutions pertaining to technological problems that arise in the hardware and software arts that underlie data storage facilities. Aspects of the present disclosure achieve performance and other improvements in peripheral technical fields including, but not limited to computer-implemented governance of data privacy.

Some embodiments include a sequence of instructions that are stored on a non-transitory computer readable medium. Such a sequence of instructions, when stored in memory and executed by one or more processors, cause the one or more processors to perform a set of acts for mapping persons to respective PII discovered over a corpus of content objects by correlating the PII to coreferenced entities contained in the context associated with the personally identifiable information.

Some embodiments include the aforementioned sequence of instructions that are stored in a memory, which memory is interfaced to one or more processors such that the one or more processors can execute the sequence of instructions to cause the one or more processors to implement acts for mapping persons to respective PII discovered over a corpus of content objects by correlating the PII to coreferenced entities contained in the context associated with the personally identifiable information.

In various embodiments, any combinations of any of the above can be combined to perform any variation of acts for coreference-resolved mapping of persons to personally identifiable information, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1B and FIG. 1C illustrate mapping techniques that can be implemented in various of the disclosed embodiments.

FIG. 4A1, FIG. 4A2, FIG. 4A3, FIG. 4A4, FIG. 4A5, FIG. 4A6, FIG. 4A7, and FIG. 4A8 illustrate an entity graph generation technique as used in systems that produce coreference-resolved mappings of persons to personally identifiable information, according to an embodiment.

FIG. 4B1, FIG. 4B2, FIG. 4B3, FIG. 4B4, and FIG. 4B5 illustrate an alternative entity graph generation technique as used in systems that produce coreference-resolved mappings of persons to personally identifiable information, according to an embodiment.

FIG. 5A and FIG. 5B depict an example entity graph augmentation technique as used in systems that produce coreference-resolved mappings of persons to personally identifiable information, according to an embodiment.

FIG. 6 presents a PII management technique as used in systems that map particular persons to particular personally identifiable information, according to an embodiment.

DETAILED DESCRIPTION

Figure 1A:
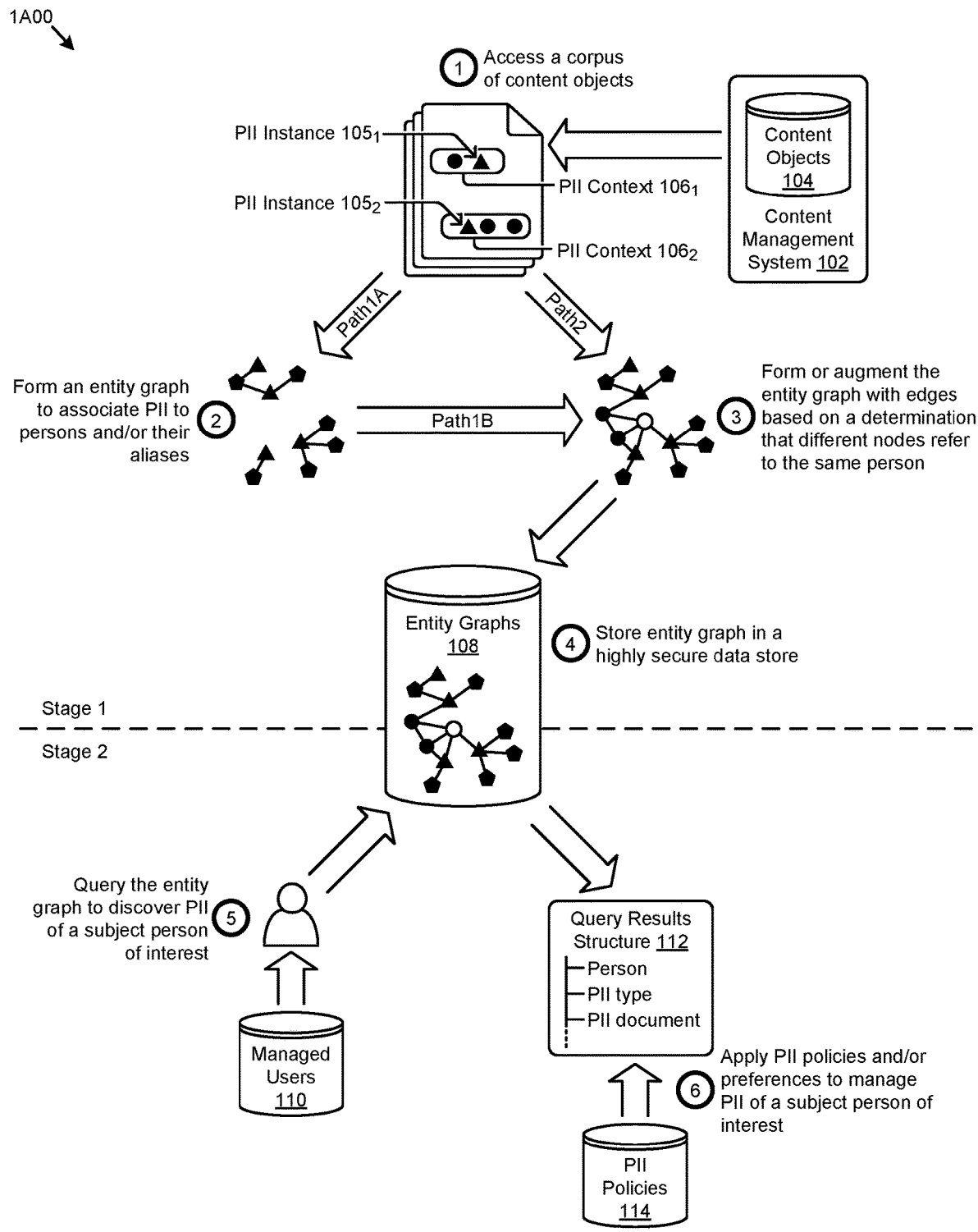
FIG. 1A illustrates a computing environment in which embodiments of the present disclosure can be implemented.

Aspects of the present disclosure solve problems associated with using computer systems for managing personally identifiable information pertaining to known and unknown persons that is embedded across various corpora of content objects. These problems are unique to computer-implemented methods for managing personally identifiable information pertaining to known and unknown persons that might be distributed across different corpora of content objects of a data storage facility. Some embodiments are directed to approaches for mapping persons to respective PII discovered over a corpus of content objects by correlating the PII to coreferenced entities contained in the context associated with the personally identifiable information. The accompanying figures and discussions herein present example environments, systems, methods, and computer program products for coreference-resolved mapping of persons to personally identifiable information.

Overview

Disclosed herein are techniques for mapping persons to respective PII discovered over a corpus of content objects by correlating the PII to a plurality of entities contained in the content objects. In certain embodiments, batches of content objects that derive from a corpus of content objects that may include PII are identified. As an example, the corpus of content objects might be the set of files, folders, chat records, metadata, and/or other computer-readable content objects that are managed at a content management system. The content objects are analyzed to discover various instances of PII included in the content objects. An entity graph is generated to record the associations between the PII and entities (e.g., names and/or aliases) and to record associations between the PII and the content objects.

In some cases, the context in proximity to, or surrounding each instance of PII in the content objects is then assessed to determine associations between the PII and coreferenced entities that are deemed to refer to the same person. In some cases, PII that is deemed to be common as between two or more entities is used to establish associations between the PII and two or more entities that refer to the same person. The associations are stored in an entity graph.

The resulting entity graph comprises a mapping between entities and PII. The entity graph can be used to record high-confidence associations between persons and their PII. The entity graph is then accessed (e.g., queried) to perform various PII-related actions over the content objects, such as PII removal and/or redaction from the content objects, PII-based content object retention and/or storage, and/or PII-based content object access permissions. In certain embodiments, instances of the PII are discovered in the content objects using PII detection rules and/or classification models. In certain embodiments, the unsupervised classification techniques use machine learning to quantify correlations between the PII and the context surrounding the PII. In some embodiments, natural language processing is used identify a named person who corresponds to pronouns (e.g., pronouns that are deemed to refer to the named person) or aliases (e.g., nicknames, titles or other references that are deemed to refer to the named person).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a computing environment 1A00 in which embodiments of the present disclosure can be implemented. FIG. 1A illustrates aspects pertaining to mapping persons to respective PII discovered over a corpus of content objects by correlating the PII to coreferenced entities contained in the context associated with the personally identifiable information. Specifically, FIG. 1A presents a logical depiction of how the herein disclosed techniques are used to build an entity graph that associates entities, content objects, and PII contained in the content objects. Representative sets of high order operations are also presented to illustrate how the herein disclosed techniques might be applied in computing environment 1A00. As shown, the high order operations might be partitioned in a first stage (e.g., "Stage 1") of operations and a second stage (e.g., "Stage 2") of operations, where "Stage 1" pertains to generating coreference-based entity graphs and "Stage 2" pertains to performing operations over the entity graphs.

Referring to the logical depiction of FIG. 1A, a corpus of content objects that might potentially contain PII are accessed (operation 1). As can be observed, a set of content objects 104 that are managed by a content management system 102 might be accessed. In this case, the provider and/or owner of content management system 102 may be responsible and/or provide a service for managing the PII that is embedded in content objects 104. The content objects are analyzed to discover various instances of PII included in the content objects. As an example, a PII instance $105_1$ and a PII instance $105_2$ are discovered in one of the content objects from content objects 104.

An entity graph is formed to record the associations between the content objects and the respective instances of PII contained in the content objects (operation 2). Once the entity graph has been formed (via path labeled as Path1A), the context surrounding each instance of PII in the content objects is assessed (via path labeled as Path1B) to determine associations between the PII and coreferenced entities that may represent respective persons (e.g., two different names for the same person). For example, a PII context $106_1$ surrounding the PII instance $105_1$ is assessed to determine one or more linked (e.g., coreferenced) entities that can be associated with PII instance $105_1$, and a PII context $106_2$ surrounding the PII instance $105_2$ is assessed to determine one or more linked (e.g., coreferenced) entities that can be associated with PII instance $105_2$. The entity graph is then augmented with edges based on a determination that different entities refer to the same person.

In some cases, context around a PII instance is assessed to determine one or more entities that are linked on the basis of anaphoric references. More particularly, and as used in some embodiments herein, context around a PII instance is assessed to determine one or more entities that are linked on the basis of pronominal anaphoric references, where the pronouns are any of the commonly used gender-specific terms such as "she" or "her", or "he", and/or where the pronouns are any of the commonly used possessive terms such as "hers" or "his".

In some cases, a database or directory is accessed through a protocol such as the lightweight directory access protocol (LDAP). The database or directory is accessed to check if a person is known (e.g., via entries in the database or directory) by multiple names or aliases. In some cases, a full name can be used in a database access to determine a natural language alias or an email alias, or a nickname, etc. In some cases, a natural language alias or an email alias, or a nickname, can be used in a database access to determine a full name. Furthermore, in some cases, some items of a person's PII can be determined through a database access, and that PII can be associated with any number of names and/or aliases of the person. In some cases, a set of user profiles, possibly in conjunction with an organization's "org chart" can be used to associate a name with an alias or title. For example, "John Smith" might be identified in such a set of user profiles, and the organization's "org chart" might list "John Smith" as the "CEO". In some cases, one or more other or additional corpora (e.g., Wikipedia) can be accessed to find something that is known or suspected about a name or alias, which in turn can be used to for a coreference relationship between a name and an alias. Such corpora can come in any form such as from IT data (e.g., active directory (AD)), and/or from an identified spreadsheet sheet (e.g., an Excel spreadsheet), and/or from a list of products, a shopping cart, etc. In some cases, application integrations (e.g., a calendar integration and/or a workflow integration) can be accessed to extract information that is known or suspected about a name or alias.

Additionally or alternatively, the entity graph can be initially formed (via path labeled as Path2) and/or augmented to include the foregoing associations between the PII and the coreferenced entities, based on a determination that different entity nodes refer to the same person (operation 3). The resulting entity graph is then stored in a highly secure data store (operation 4). For example, specialized data structures and/or governance may be implemented to protect the PII elements in a set of entity graphs 108 that include the aforementioned entity graph.

With the "Stage 1" of operations concluding with the generation and storage of entity graphs 108, "Stage 2" commences with a query of an entity graph to discover PII that is related to a subject person (operation 5). In some cases, the subject person might be from a set of managed users 110 known by content management system 102. In other cases, the subject person may not be explicitly known by content management system 102.

The query and/or other processing over entity graphs 108 might be initiated by various events, such as employee off-boarding, user PII preference changes, PII policy changes, and/or other events. The results returned by the query describe high-confidence (e.g., according to some confidence threshold) associations between the subject person and their PII as contained in one or more of the content objects. For example, as shown in a query results structure 112, instances of the aforementioned high-confidence associations might describe the person (e.g., a subject person of interest), their PII type, and one or more PII documents that correspond to each respective high-confidence association found in the entity graph. With this information, various PII policies (e.g., PII policies 114) and/or preferences can be applied to manage the PII of the subject person of interest (operation 6). For example, PII-related actions can be performed over the identified content objects (e.g., PII documents), which actions may include PII removal and/or redaction from the content objects, PII-based content object retention and/or storage, and/or PII-based content object access permissions.

Techniques corresponding to the shown Path1A, Path1B and Path2 are disclosed in further detail as pertains to FIG. 1B and FIG. 1C. The mapping technique 1B00 and the mapping technique 1C00 are being presented side-by-side so as to contrast the differences and compare similarities between the two techniques. As shown, both techniques commence with method steps (e.g., step 116 and step 124) that operate to find PII. However the approach for correlating names and aliases differ as between the two techniques. Portions of the two techniques correspond to the paths (e.g., Path1A, Path1B, and Path2) of FIG. 1A.

To illustrate, and as shown in the mapping technique 1B00 of FIG. 1B, the path segment identified at "Path1A" corresponds to step 116 and step 118, and the path segment identified as "Path1B" correspond to step 120 and step 122. More specifically, and as shown, the operations corresponding to "Path1A" commence at step 116, where a content object is subjected to rules, and/or heuristics and/or other techniques to find PII. When PII is found, or at least suspected, a name or alias is associated with the PII (step 118). The foregoing association can be made on the basis of a lookup or search operation (e.g., a lookup into database, or search through a directory) to find out the person that owns the PII. Strictly as one example, a search through a directory might reveal that the PII string "123-45-6789" is the social security number (SSN) of "John Smith". As another example, linguistic analysis of the context around the PII string might reveal that the PII string "123-45-6789" is the social security number (SSN) of "Our CEO" which in turn is pronominally coreferenced to "John Smith".

When PII is found, or at least suspected, the name or names or alias or aliases associated with the PII are placed as nodes in an entity graph (step 120). Edges referring to associations between the name or names or alias or aliases and the PII are added to the entity graph (step 122).

As shown in the mapping technique 1C00 of FIG. 1C, the path segment identified at "Path2" corresponds to step 124, step 126, and step 128. Step 124 operates over a corpus of content objects to find PII and corresponding names and aliases. Step 126 uses any known technique to find PII that is common between two different names or aliases. When such PII that is common between two different names or aliases is found, then nodes corresponding to the two different names or aliases are populated into the graph and edges between the nodes and the common PII are added (step 128). Once there are at least two edges that relates the common PII to two different names or aliases, then other PII (e.g., beyond the aforementioned common PII) that belongs to the name can be correlated to the alias (step 130). Similarly, once there are at least two edges that relates the common PII to two different names or aliases, then other PII (e.g., beyond the aforementioned common PII) that belongs to the alias can be correlated to the name.

The foregoing mapping techniques of FIG. 1B and FIG. 1C can be carried out in any environment. Example environments involving several corpora of content objects are shown and described as pertains to FIG. 2A and FIG. 2B.

Figure 2A:
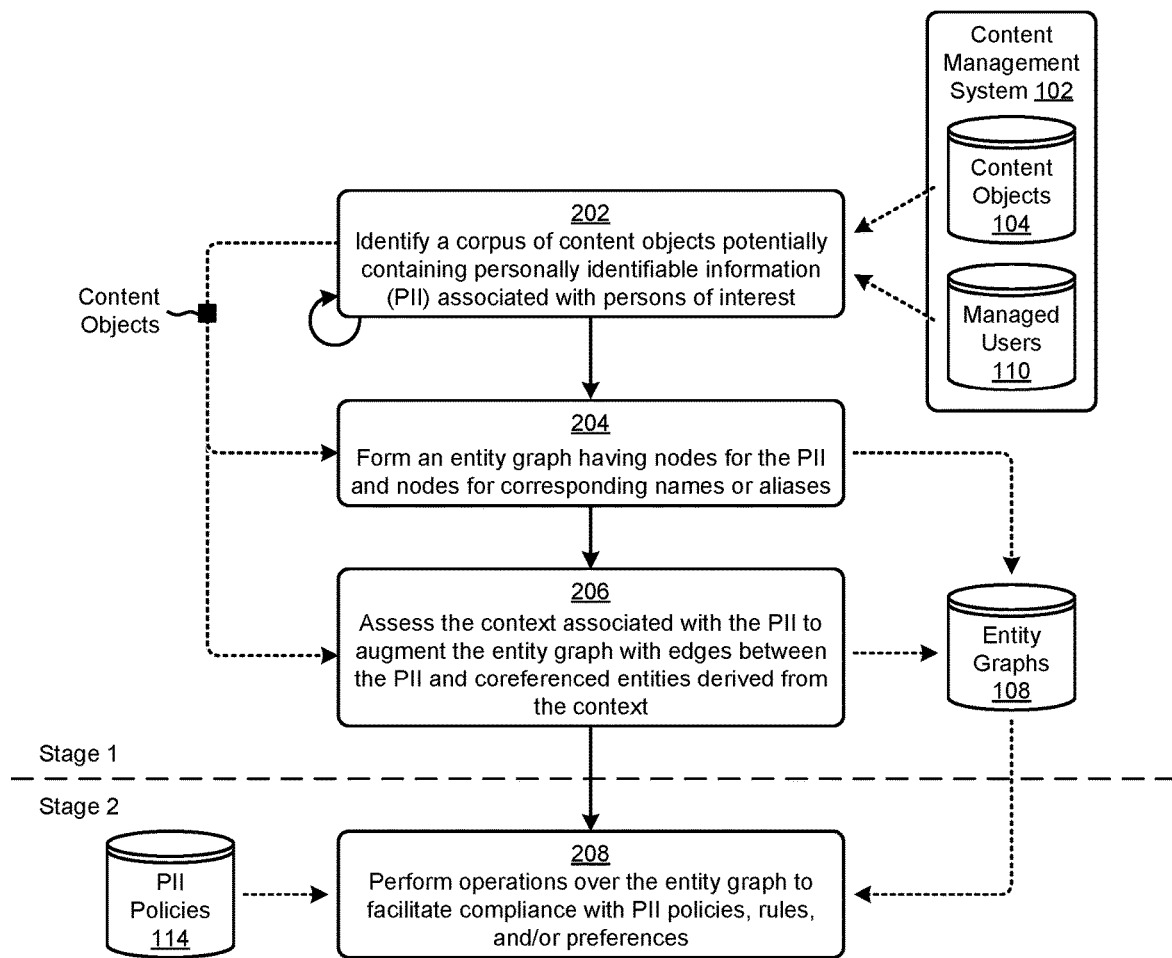
FIG. 2A depicts a PII coreferencing technique as implemented in systems that implement mapping of persons to personally identifiable information, according to an embodiment.

FIG. 2A depicts a PII coreferencing technique 2A00 as implemented in systems that implement mapping of persons to personally identifiable information. As an option, one or more variations of the PII coreferencing technique 2A00 or any aspect thereof may be implemented in the context of the architecture and functionality of the embodiments described herein and/or in any in any environment.

FIG. 2A illustrates aspects pertaining to mapping persons to respective PII discovered over a corpus of content objects by correlating the PII to coreferenced entities contained in the context associated with the personally identifiable information. As heretofore mentioned, the steps and/or operations can be grouped into a set of "Stage 1" operations and a set of "Stage 2" operations.

The "Stage 1" operations of the PII coreferencing technique 2A00 commence by identifying a corpus of content objects that potentially contain PII associated with persons of interest (step 202). As can be observed, the corpus of content objects might comprise some or all of content objects 104 managed by content management system 102. The person or persons of interest might also be derived from managed users 110 associated with content management system 102.

When a then-current selection of content objects is identified, an entity graph is formed to interrelate PII discovered in the content objects with entities (e.g., names or aliases) that correspond with (e.g., entities who own or are associated with) the PII (step 204). In most cases, all elements of the content objects that might be PII are recorded in the entity graph. The PII discovered in the content objects may or may not be associated with any of the persons of interest. As illustrated, the entity graph may be recorded in entity graphs 108.

The context associated with the discovered PII is assessed to augment the entity graph with interrelations between the PII and coreferenced entities derived from the context (step 206). The context of the PII is often represented by collections of linguistic expressions that surround a particular instance of PII. According to the herein disclosed techniques, these linguistic expressions are analyzed to determine coreferenced associations between a first linguistic expression and a second linguistic expression such that the different references to the same person can be identified (e.g., "John" is the same person as "Johnathan"). The determination that, for example, "John" is the same person as "Johnathan" can be recorded in entity graphs (e.g., entity graphs 108). Scores can be used as a confidence value that the two different references are indeed the same person.

In one embodiment, the content of the linguistic expressions that form the context around discovered PII are analyzed to determine coreferenced associations between linguistic expressions such that a likelihood that two or more of the nodes of persons are the same person. These coreferenced associations are recorded in the entity graph together with attributes (e.g., scores, likelihood values, source of the context, etc.). The occurrence of and/or value of the attributes serve to facilitate calculating a confidence value as to whether two particular nodes of persons do indeed refer to the same person. If so, then it can be inferred that the PII associated with a first node (e.g., a node for "John") also belongs to a second node (e.g., a node for "Johnathan"). As such, when identifying PII belonging to a person of interest (e.g., "John"), then the PII belonging to an alias for the person of interest (e.g., "Johnathan") is also identified as PII belonging to the person of interest.

The "Stage 2" operations of PII coreferencing technique 2A00 exploits the depth and breadth of the associations codified in the entity graph by performing operations (e.g., queries, etc.) over the entity graph to facilitate compliance with PII policies, rules and/or preferences (step 208).

The foregoing is merely one example coreference-based PII mapping technique. Different ratios between a number of content objects versus a ratio of persons referenced in such content objects might inform selection of any one of more of a variety of alternative processing techniques. One such alternative processing technique is shown and described as pertains to FIG. 2B.

Figure 2B:
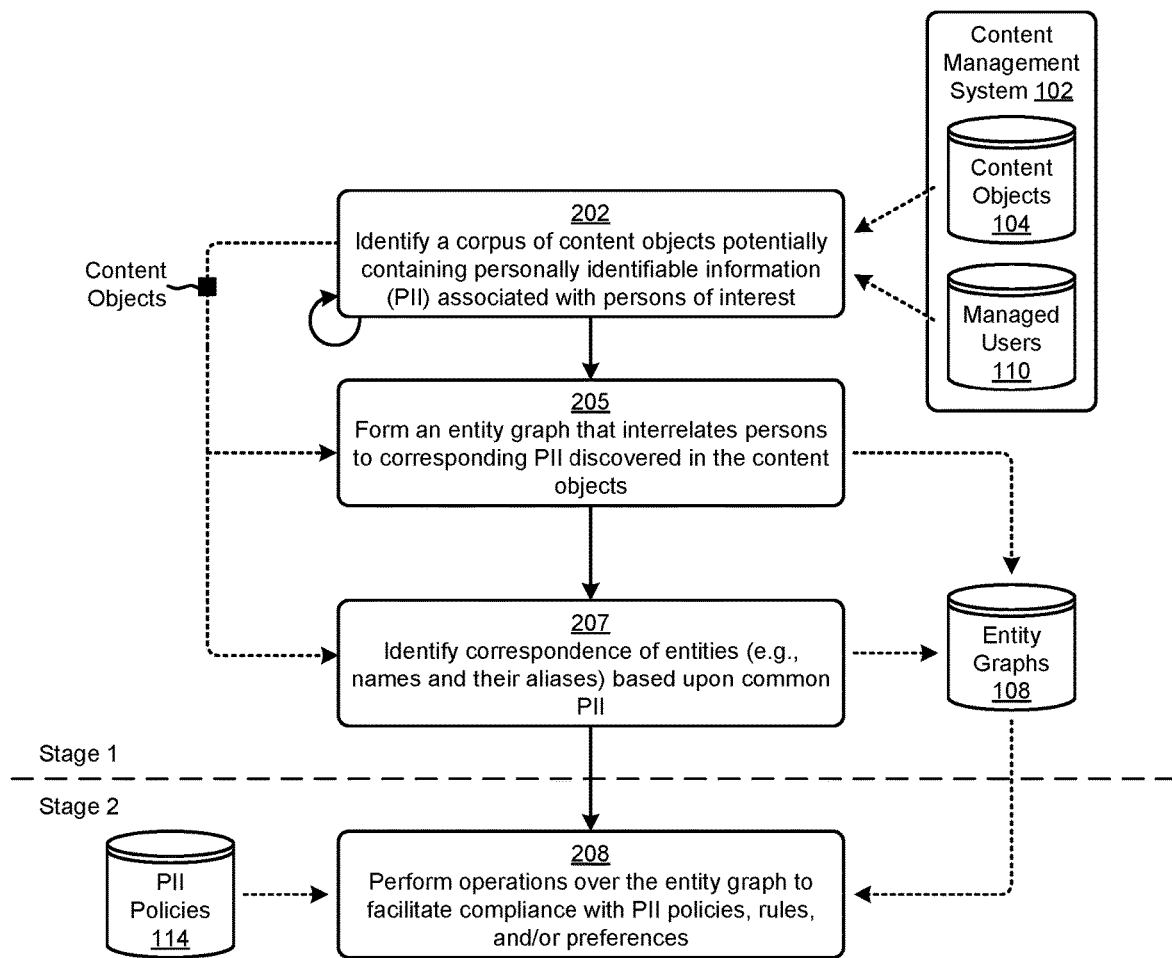
FIG. 2B depicts a PII-in-common mapping technique as implemented in systems for mapping of persons to personally identifiable information, according to an embodiment.

FIG. 2B depicts a PII-in-common mapping technique 2B00 as implemented in systems that implement mapping of persons to personally identifiable information. As an option, one or more variations of the PII-in-common mapping technique 2B00 or any aspect thereof may be implemented in the context of the architecture and functionality of the embodiments described herein and/or in any in any environment.

FIG. 2B illustrates aspects pertaining to mapping persons to respective PII discovered over a corpus of content objects by identifying PII that is common to two or more entities. Specifically, the figure is presented to illustrate one embodiment of certain steps and/or operations performed over a network of devices (e.g., user devices, computing systems, etc.) that generate entity graphs comprising edges that relate different entities to PII that is common between the two or more entities. As can be observed, the steps and/or operations can be grouped into a set of "Stage 1" operations and a set of "Stage 2" operations.

The "Stage 1" operations of PII-in-common mapping technique 2B00 commence by identifying a corpus of content objects that potentially contain PII associated with a person or persons of interest (step 202). As can be observed, the corpus of content objects might comprise some or all of content objects 104 managed by content management system 102. The person or persons of interest might also be derived from managed users 110 associated with content management system 102. As indicated in the figure, identification of the corpus of content objects identified in the PII-in-common mapping technique is continuously updated as content objects are added or deleted.

When a then-current selection of content objects is identified, rules, models and/or heuristics are applied to discover PII in the content objects. An entity graph is formed to interrelate discovered PII to corresponding persons (step 205). In most cases, all elements of the content objects that might be or are even potentially PII are recorded in the entity graph. As illustrated, the entity graph may be recorded in entity graphs 108 comprising entity nodes, PII nodes, and edges between entity nodes and PII nodes.

During processing of the entity graph (e.g., by selecting an initial entity node, and by traversing to other nodes through edges of the graph) it might be determined that a particular item of PII is common between two or more different entity nodes. In this situation, a hypothesis, and in some cases, a determination can be made that the two or more different entity nodes refer to the same person based on edges that are connected between the two or more different entity nodes and a common item of personally identifiable information (step 207).

Additionally, or alternatively, the context associated with the discovered PII is assessed to determine if any two or more of the nodes of persons are deemed to be the same person (e.g., "John" is an alias for "Jonathan"). The entity graph is augmented with edges between any two or more of the nodes of persons or the person's aliases, where the nodes of persons the person's aliases are deemed to correspond to the same person.

The "Stage 2" operations of PII-in-common mapping technique 2B00 exploits the depth and breadth of the associations codified in the entity graph by performing operations (e.g., queries, etc.) over the entity graph. At step 208, analysis of the results of the queries can be used to facilitate compliance with PII policies, rules and/or preferences for handling PII. For example, a set of PII policies 114 might require that entity graphs 108 be queried on an ongoing basis to comply with such policies. Any user from managed users 110 may change their PII preferences, which in turn triggers (e.g., asynchronously and/or scheduled) a query of entity graphs 108 to identify and take action over any then-current set of content objects that contain PII associated with the user.

Figure 3A:
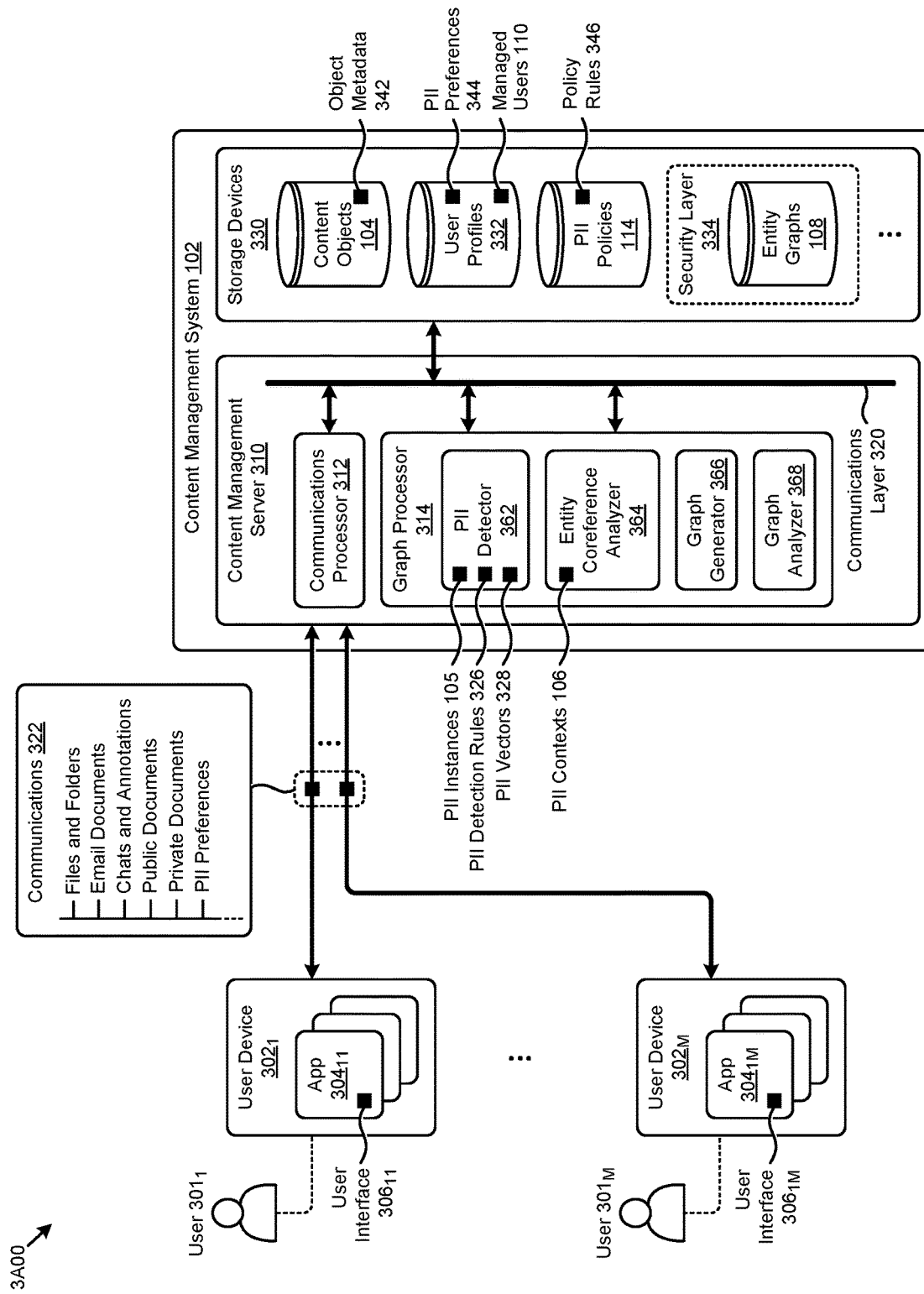
FIG. 3A presents a block diagram of a system that implements coreference resolution to map particular persons to particular personally identifiable information, according to an embodiment.
Figure 3B:
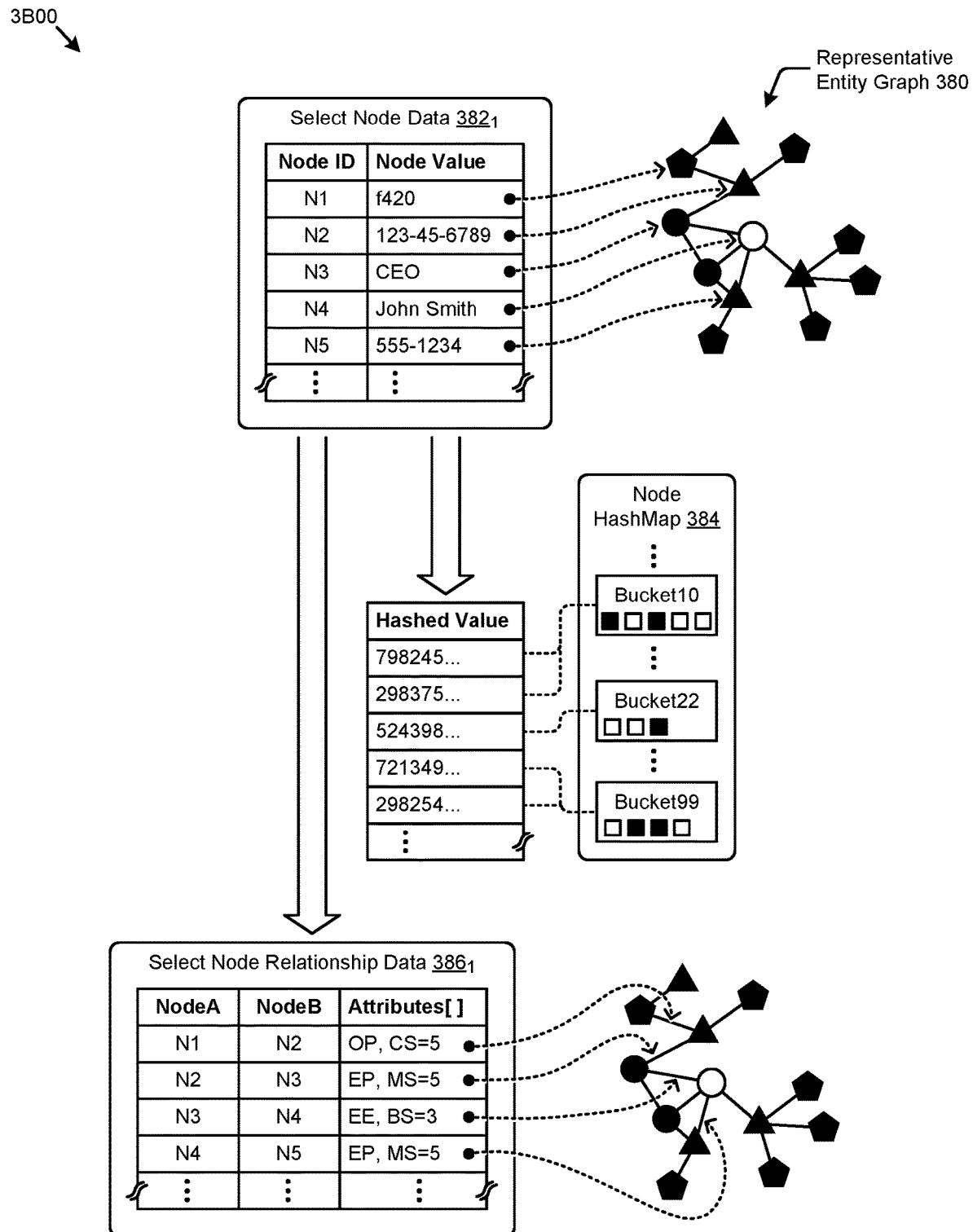
FIG. 3B presents illustrations of graph data structures as implemented in systems that use coreference-resolution for mapping of persons to personally identifiable information, according to an embodiment.

One embodiment of a system, together with example data flows and example data structures for implementing the foregoing PII mapping techniques disclosed herein, is shown and described as pertains to FIG. 3A and FIG. 3B.

FIG. 3A presents a block diagram of a system 3A00 that implements coreference resolution to map particular persons to particular personally identifiable information. As an option, one or more variations of system 3A00 or any aspect thereof may be implemented in the context of the architecture and functionality of the embodiments described herein and/or in any in any environment.

FIG. 3A illustrates aspects pertaining to mapping persons to respective PII discovered over a corpus of content objects by correlating the PII to coreferenced entities contained in the context associated with the personally identifiable information. Specifically, the figure is being presented to show one embodiment of certain representative components and associated data structures and data flows implemented in a computing environment to facilitate the herein disclosed techniques. As shown, the components, data flows, and data structures are associated with a set of users (e.g., user $301_1, \ldots$, user $301_M$) that interact with other users and a set of content objects 104 managed at a content management system 102.

A content management system such as content management system 102 "manages" a plurality of content objects at least in part by maintaining (e.g., storing, updating, resolving interaction conflicts, etc.) the content objects subject to the various interactions performed over the content objects by users of the content objects. A set of managed users 110 might comprise all of the users with access to at least a portion of the content objects 104. The components, data flows, and data structures shown in FIG. 3A present one partitioning and associated data manipulation approach. The specific example shown is purely exemplary, and other subsystems, data structures, and/or partitioning are reasonable.

As shown, system 3A00 comprises an instance of content management server 310 operating at content management system 102. Content management server 310 comprises an instance of a communications processor 312 and an instance of a graph processor 314. Graph processor 314 comprises an instance of a PII detector 362, an instance of an entity coreference analyzer 364, an instance of a graph generator 366, and an instance of a graph analyzer 368. A plurality of instances of the foregoing components might operate at a plurality of instances of servers (e.g., content management server 310) at content management system 102 and/or any portion of system 3A00. Such instances can interact with a communications layer 320 to access each other and/or a set of storage devices 330 that store various information to support the operation of the components of system 3A00 and/or any implementations of the herein disclosed techniques.

Specifically, as can be observed, the servers and/or storage devices of content management system 102 facilitate interactions over content objects 104 by the users (e.g., user $301_1, \ldots,$ user $301_M$) from a respective set of user devices (e.g., user device $302_1, \ldots,$ user device $302_M$). In some cases, such interactions are performed using the respective user interfaces (e.g., user interface $306_{11}, \ldots,$ user interface $306_{1M}$) of various applications (e.g., app $304_{11}$, app $304_{1M}$) operating on the user devices. User interactions often involve instances of communications 322 transferred to and from a user device (e.g., user device $302_1, \ldots,$ user device $302_M$) and an operational element (e.g., content management server 310) of a content management system. As can be observed, such communications can pertain to various instances of content objects accessed by the users, such as files, folders, emails, chats, annotations, and/or other content objects. Such content objects may be public documents (e.g., accessible by many or all users) or private documents (e.g., accessible by one user). As described herein, the aforementioned content objects and/or other content objects may contain PII. Other types of data objects communicated to and from content management system 102 are possible.

The content objects (e.g., files, folders, documents, etc.) in content objects 104 are characterized at least in part by respective sets of object metadata 342 stored at storage devices 330. Furthermore, information about the managed users 110 associated with content management system 102 is stored in a set of user profiles 332 in storage devices 330. As indicated in communications 322, users may also communicate respective PII preferences to content management system 102, which are stored as respective instances of PII preferences 344 in user profiles 332. Storage devices 330 also stores a set of PII policies 114 which may comprise various instances of policy rules 346 to facilitate application of the PII policies over the content objects, users, and/or other constituents associated with content management system 102. Various instances of entity graphs 108 generated by the herein disclosed techniques are stored over storage devices 330. As can be observed, certain security techniques may be implemented to provide a security layer 334 around the entity graphs 108 as the entity graphs contain information that logically relates PII to respective persons.

A particular entity graph is formed by graph processor 314 receiving from content management system 102 a set of content objects to analyze. The set of content objects may comprise some or all of content objects 104. PII detector 362 analyzes the content objects to identity a set of PII instances 105. In some cases, PII instances 105 are identified by applying one or more instances of PII detection rules 326 to the content of the content objects to detect the PII. Such an approach can be used when the PII is clearly organized and/or referenced (e.g., a table or form with labels that refer to known PII such as "Social Security Number", "SSN", "Credit Card Number", "CCN", etc.).

In other cases, the PII may be less detectable. For example, a sequence of 10 numbers may be a phone number, but may also be some other non-PII numeric identifier. In such cases, other techniques may be implemented to detect PII with a high confidence (e.g., a higher percentage probability that the detected PII is indeed PII). One such technique maps the linguistic expressions surrounding a potential PII instance into PII vectors 328 (e.g., using Google's Universal Sentence Encoder). Machine learning is used to find correlations of the linguistic expressions to the PII to facilitate classification of the PII. As an example, if the foregoing analysis reveals a high correlation between a phone number and other components of a person's address (e.g., street number, street name, city, state, and zip code) then, when a sequence of 10 numbers are embedded in a set of address components, that sequence of 10 numbers has a high probability of being a phone number. The foregoing technique is an unsupervised classification technique in that no training is performed prior to the correlation determination.

When the associations between PII and the content objects that contain the PII are established, an entity graph is augmented to include the associations between the PII and the various entities that might represent a person. Specifically, according to the herein disclosed techniques, entity coreference analyzer 364 identifies and analyzes respective instances of PII contexts 106 surrounding the PII instances 105 and maps one or more entity expressions (e.g., linguistic expressions that refer to a person) derived from the PII contexts to the PII instances. Graph generator 366 forms the entity graph by recording the PII instances and entity expressions as graph "nodes" and the associations over the PII instances and entity expressions as graph "edges". Graph analyzer 368 of graph processor 314 facilitates execution of various operations over instances of entity graphs 108 to return results. For example, graph analyzer 368 may query an entity graph to determine all of the content objects that contain PII for a particular user from managed users 110.

The foregoing discussions describe techniques for storage of entity graphs 108 in a secure manner (e.g., in security layer 334), which techniques are disclosed in further detail as follows.

FIG. 3B presents illustrations of graph data structures 3B00 as implemented in systems that use coreference-resolution for mapping of persons to personally identifiable information. As an option, one or more variations of graph data structures 3B00 or any aspect thereof may be implemented in the context of the architecture and functionality of the embodiments described herein and/or in any in any environment.

FIG. 3B illustrates aspects pertaining to mapping persons to respective PII discovered over a corpus of content objects by correlating the PII to coreferenced entities contained in the context associated with the personally identifiable information. Specifically, the figure is being presented to show one embodiment of certain data structures for storing data associated with one or more entity graphs.

Specifically, a set of select node data $382_1$ describes at least a portion of the nodes associated with a representative entity graph 380. The five nodes (e.g., N1, N2, N3, N4, and N5) shown represent various types of nodes. For example, node N1 represents a content object (e.g., file: "f420"), node N2 and node N5 represent PII instances (e.g., SSN: "123-45-6789" and phone number: "555-1234"), and node N3 and node N4 represent entity expressions (e.g., a person's title: "CEO" and person's name: "John Smith", respectively).

To facilitate obfuscation of the PII and other node values, and to increase the efficiency of searches for nodes in the entity graphs, the node values are hashed and stored in a HashMap. As illustrated, for example, the node values in select node data $382_1$ are hashed to derive respective hash values. These hash values correspond to buckets (e.g., bucket10, bucket22, bucket99) that in turn are stored in node HashMap 384. Use of a HashMap facilitates fast lookups of the nodes of representative entity graph 380.

As can be observed, representative entity graph 380 further comprises edges between the nodes to represent the associations (e.g., relationship, interrelationships) between the nodes. A set of select node relationship data 386₁ codifies the associations between pairs of nodes (e.g., node N1 and node N2, node N2 and node N3, node N3 and node N4, node N4 and node N5, etc.). The node relationship data may also record various attributes pertaining to the relationship. For example, an indicator of the type of association may be recorded. Specifically, type=OP indicates a content object to PII relationship, type=EP indicates an entity to PII relationship, and type=EE indicates an entity to entity relationship (e.g., for coreferenced entities that refer to the same person). As another example, an indicator of the strength and/or confidence of an association may be recorded. Strictly as one illustrative way to indicate strength and/or confidence of an association, a confidence score (CS) may be defined to indicate a level of confidence (e.g., low=1 to high=5) that a PII node is real PII, a mapping score (MS) may be defined to indicate a strength (e.g., low=1 to high=5) of an entity to PII relationship, and a binding score (BS) may be defined to indicate a strength (e.g., low=1 to high=5) of an entity to entity relationship. Other strength indicators and/or attributes are possible.

The foregoing discussions include techniques for forming entity graphs that associate PII to persons and/or a person's aliases, which techniques are disclosed in further detail as follows.

FIG. 4A1 through FIG. 4A8 illustrate an entity graph generation technique as used in systems that produce coreference-resolved mappings of persons to personally identifiable information. As an option, one or more variations of the entity graph generation technique or any aspect thereof may be implemented in the context of the architecture and functionality of the embodiments described herein and/or in any in any environment.

The sequence of FIG. 4A1 through FIG. 4A8 are being presented to illustrate one embodiment of a flow of certain steps and/or operations that facilitate forming an entity graph that interrelates PII discovered in a set of content objects with the respective aliases that share the same PII.

The entity graph generation technique commences by selecting a batch of content objects to analyze for PII (step 402₁). As illustrated, the batch of content objects may be included in content objects 104 of content management system 102 and include any number of files. In some cases, all of the files of a content management system are selected in a single batch. In other cases, only a subset of all of the files of a content management system are selected in a single batch. In some cases, a subset might include only those files that are associated with a sharing record (e.g., a collab-in record) that references the person of interest. For example, in some collaboration systems, metadata is maintained such that any particular file can be shared, possibly with different types of sharing permissions with a statically- or dynamically-defined set of collaborators (e.g., by referencing a set of users or user profiles, etc.).

For each content object from the batch of content objects, various PII detection rules are applied to the content object to detect all instances of PII in the content object (step 404). An instance of PII detector 362 may apply a set of PII detection rules 326 to portions of a content object to detect PII instances. As earlier described, other techniques (e.g., unsupervised classification) may be implemented to detect the PII.

If PII is found in the content object ("Yes" path of decision 406), then the detected PII and corresponding person are added as nodes in the graph (step 407). Edges between the PII and the corresponding person are also added to the graph (step 409). If no PII is found in the content object ("No" path of decision 406), then the FOR loop iterates to the next content object.

In the specific example of FIG. 4A1, a node PN and a node SSN are added since, due to the sentence, "Johnathon Smith's SSN is 123-45-6789", the detected PII "123-45-6789" can be deemed to correspond to "Johnathan Smith". Also, In the specific example of FIG. 4A1, a node PA and a node DOB is added since, due to the sentence, "John's DOB is 1/10/1980", the detected PII "1/10/1980" can be deemed to correspond to "John".

The flow continues from the bottom of FIG. 4A1 to the top of FIG. 4A2. Step 428 serves to identify a plurality of linguistic expressions that pertain to the previously-identified PII. In this example, two linguistic expressions are considered, namely, "Johnathon Smith's SSN is 123-45-6789" and "I can say that I have it on good authority that John's DOB is 1/10/1980". Using part of speech (e.g., pronouns, verbs, nouns, etc.) natural language classification techniques in combination with coreference resolution techniques (step 430), expressions that refer to the same person are identified (e.g., via the shown coreference resolution 437). When the expressions that are deemed to refer to the same person are identified, then the names/aliases referring to the same person can be correlated (step 432). The graph can then be augmented by adding an edge between nodes that refer to the same person (step 434). At least inasmuch as the foregoing nodes that refer to the same person have corresponding PII, then an edge between the named person and the alias' PII can be added (step 436). Similarly, at least inasmuch as the foregoing nodes that refer to the same person have corresponding PII, then an edge between the node of the alias of the named person and the named person's PII can also be added (step 438). The notion of an alias can span many variations, include nicknames, titles, possessives, etc. Some of the variations are presented hereunder in the examples.

A step-by-step example of construction of a graph in accordance with the foregoing flows of FIG. 4A1 and FIG. 4A2 is shown and described as pertains to FIG. 4A3 through FIG. 4A8.

Step-by-Step Graph Construction

The step-by-step example in the series of figures from FIG. 4A3 through FIG. 4A8 constitute a method for mapping of personally identifiable information to a person using natural language processing (e.g., by applying coreference resolution algorithms). Specifically, and as shown in FIG. 4A3, a content object (e.g., the shown content object "D1") is selected from the content objects 104 of content management system 102. The selected content object is analyzed to identify a first set of personally identifiable information contained in the at least one content object and to identify a second set of entities associated with items in the first set of personally identifiable information. A graph is formed by generating a first node, where the first node represents a name from the second set of entities and a second node that represents a first item of personally identifiable information (operation 4A). Next, first edge is generated that interrelates the two aforementioned first and second nodes (operation 4B).

The graph of FIG. 4A3 is augmented as shown in FIG. 4A4. Specifically, based on the foregoing identification of PII, a third node that represents an alias from the second set of entities and a fourth node that represents a second item of personally identifiable information are added to the graph (operation 4C). Then a second edge that interrelates the third node (e.g., an alias, "John") and the fourth node (e.g., John's date of birth (DOB)) is added (operation 4D).

As shown in FIG. 4A5, linguistic analysis is performed over the at least one content object (e.g., the shown "D1") so as to determine that the name (e.g., "Johnathan Smith") and the alias (e.g., "John") refer to the same person. The linguistic analysis can cover multiple portions of a given document. Moreover, the linguistic analysis can decompose passages to identify compound nominative clauses, possessive constructions, subject-attribute relationships, etc. When a determination that the name (e.g., "Johnathan Smith") and the alias (e.g., "John" or "John's") refers to the same person, then a third edge is added to record an association between the first node that represents a name and the third node that represents an alias (operation 4E). The added edge can be labeled as a coreference relationship.

Figure 6:
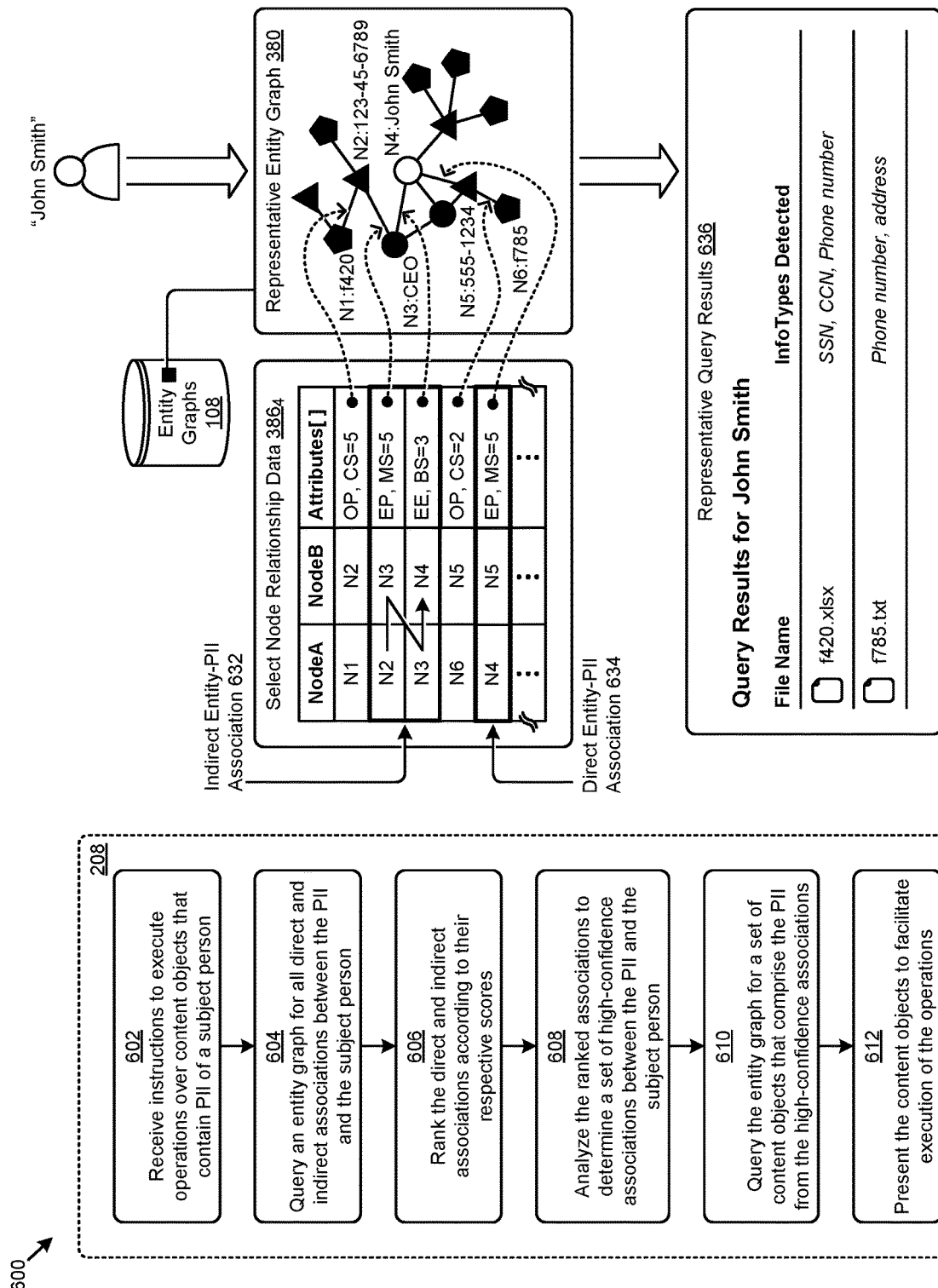

Continuing this example, now referring to FIG. 4A6, and now having the coreference relationship 431 that relates two nodes as referring to the same person, the graph can be still further augmented on the basis of the linguistic analysis (and the added the coreference edge 431) by adding a fourth edge (operation 4F of FIG. 4A6) that correlates the name to the second item of personally identifiable information and even still further augmented by adding a fifth edge (operation 4G of FIG. 4A6) that correlates the alias back to the first item of personally identifiable information.

Now, returning to discussion of uses of the graph, an identification of the content object can be adding to the graph (e.g., "D1" as shown in FIG. 4A7), a sixth edge that correlates a first item of personally identifiable information to the content object, and a seventh edge that correlates a different item of personally identifiable information to the content object, can be added to the graph (operation 4H). In doing so, documents that at least potentially contain PII of a particular person of interest can be identified. This is because, given the foregoing graph, and given a person's name corresponding to the particular person of interest, a query over the graph can be formulated such that the results of the query comprise (1) a first item of personally identifiable information of the particular person of interest, and (2) a different item of personally identifiable information of the alias belonging to the particular person of interest.

This is shown in FIG. 4A8 as operation 5, where a query is formed to discover the location or locations of where (e.g., in what document or documents) PII of a subject person of interest is located. Strictly as an example, once the location or locations of where PII of a subject person of interest is present, then steps can be taken to eliminate occurrences of the personally identifiable information of the person of interest. As another example, a query can be performed over the graph to determine subject content objects that includes items of personally identifiable information of the person of interest and/or items of the person of interest's personally identifiable information that derive from the existence of PII associated with an alias of the person of interest.

Steps can be taken to eliminate occurrences of the personally identifiable information that is ascribed to the person of interest and/or personally identifiable information that is ascribed to aliases of the person of interest. In some situations, any number of PII policies and/or PII management preferences can be applied (operation 6). In some cases, a document that contains personally identifiable information of the person of interest can be deleted. In other cases, portions of a document that contains personally identifiable information of the person of interest can be redacted.

In some embodiments, two or more of the graph generation techniques as heretofore-described as pertains to FIG. 4A3 through FIG. 4A8 can be combined so as to implement a method for associating PII to a person and the person's aliases. Specifically, a method commences upon analyzing content objects to identify a first set of personally identifiable information contained in the content objects and to identify a second set of entities associated with items in the first set of personally identifiable information. When the foregoing first set and second set have been populated, then steps are taken for forming a graph comprising a first edge that interrelates a first node that represents a name (e.g., a name taken from the second set of entities) to a second node that represents a first item of personally identifiable information. A third node that represents an alias (e.g., an alias taken from the second set of entities) and a fourth node that represents a second item of personally identifiable information are interrelated by adding a second edge to the graph.

Linguistic analysis is performed over portions of the content objects that contain the identified PII. The linguistic analysis confirms, at least to a quantifiable degree of certainty, that the name and the alias refer to the same person. If the quantifiable degree of certainty meets a threshold, then a third edge that records an association between the first node that represents a name and the third node that represents the alias is added.

Additional edges can be added based on the linguistic analysis. For example, a fourth edge that correlates the name to the second item of personally identifiable information can be added to the entity graph. Still further, a fifth edge that correlates the alias and the first item of personally identifiable information can be added to the entity graph.

The resulting entity graph is query-able such that, given a person of interest's name, the results of the query can return (1) a first item of personally identifiable information of the person, and (2) a different item of personally identifiable information belonging to the alias that refers to the same person as the person of interest.

The entity graph can be still further augmented. Strictly as an example, a fifth edge that correlates the first item of personally identifiable information to the content object in which the personally identifiable information can be added. Furthermore, and strictly as an example, a sixth edge that correlates the different item(s) of personally identifiable information to the content object can be added.

The foregoing example shown and described as pertains to FIG. 4A1 through FIG. 4A8 depicts merely one possible scenario for generating an entity graph. Other techniques for generating an entity graph are possible. One alternative entity graph generation technique is shown and described as pertains to FIG. 4B1, FIG. 4B2, FIG. 4B3, FIG. 4B4, and FIG. 4B5.

FIG. 4B1, FIG. 4B2, FIG. 4B3, FIG. 4B4, and FIG. 4B5 illustrate an alternative entity graph generation technique 4B100 as used in systems that produce coreference-resolved mappings of persons to personally identifiable information. Specifically, FIG. 4B1 shows a flow chart of an alternative entity graph generation technique as used in systems that produce coreference-resolved mappings of persons to personally identifiable information. As an option, one or more variations of entity graph generation technique or any aspect thereof may be implemented in the context of the architecture and functionality of the embodiments described herein and/or in any in any environment.

FIG. 4B1 illustrates aspects pertaining to mapping persons to respective PII discovered over a corpus of content objects by correlating the PII to coreferenced entities contained in the context associated with the personally identifiable information. Specifically, the figure is presented to illustrate one embodiment of certain steps and/or operations that facilitate forming an entity graph that interrelates PII discovered in a set of content objects with the respective content objects containing the PII.

In this embodiment, the alternative entity graph generation technique commences by selecting a batch of content objects to analyze for PII (step $402_2$). As illustrated, the batch of content objects may be included in content objects 104 and include a file 420 (e.g., identified as file "f420"). For each content object from the batch of content objects, various PII detection rules are applied to the content object to detect all instances of PII in the content object (step 404). An instance of PII detector 362 may apply a set of PII detection rules 326 to file 420 to detect PII instance $105_3$ (e.g., phone number: 555-6789) and PII instance $105_4$ (e.g., SSN: 123-45-6789).

If PII is found in the content object ("Yes" path of decision 406), then the PII and a name (or alias) are populated as edge-connected nodes into a location within the entity graphs (step 408). In some cases, one or more confidence scores are determined for each of the PII instances discovered in the content object. Confidence scores may be codified as attributes and associated to corresponding edges of the nodes in an entity graph.

The technique proceeds by checking PII nodes of the entity graphs 108 for occurrence of the same PII (decision 409). If, the same PII is detected (e.g., "123-45-6789") then a list of names or aliases is formed and maintained (step 410). More specifically, if the PII found in step 404 (e.g., "123-45-6789") is the same PII as is being considered in decision 409 (e.g., "123-45-6789"), then the name associated with same PII is being considered in decision 409 is added to the list (step 410). Additionally, in some embodiments, associations between other names or aliases are recorded as edges between the other names or aliases and the same PII (step 412). Strictly as one example, if the PII "123-45-6789" is shared by "John" and also by the alias "Our CEO" and also by the alias "His SSN", then associations (e.g., graph edges) are recorded (1) between "John" and the PII node corresponding to "123-45-6789", (2) between "Our CEO" and the PII node corresponding to "123-45-6789", and between "His SSN" and the same PII node corresponding to "123-45-6789". The updated graph with at least some of the foregoing edges are saved in entity graphs 108.

The foregoing discussions include techniques for generating an entity graph based on common PII. A detailed example of graph generation and augmentation is disclosed in further detail as follows. Specifically, FIG. 4B2, FIG. 4B3, FIG. 4B4, and FIG. 4B5 present an example step-by-step entity graph generation technique 4B200.

The example of FIG. 4B2, FIG. 4B3, FIG. 4B4, and FIG. 4B5 is illustrated in a system that has a PII-in-common mapping module 455 that processes content objects 104 in a manner that results in graph $457_{STEP1}$. In the step depicted by FIG. 4B2, the two nodes, one node for a name (e.g., "John") and one node for the associated PII (e.g., "SSN") are placed on the graph. An edge between "John" and his "SSN" is added between the two nodes.

In FIG. 4B3, any existing PII nodes in the entity graphs 108 are checked to see if any of the PII nodes correspond to "SSN". In this example, there is such a PII node that corresponds to "SSN", specifically a node corresponding to "SSN" is found. That node corresponding to "SSN" is connected to an alias node "Our CEO". As such, the name "John" and the alias "Our CEO" are deemed to refer to the same person, at least because of the PII-in-common. This is shown by graph $457_{STEP2}$.

In some cases, a name or alias node may be associated (e.g., by a graph edge) to other PII. This is shown in FIG. 4B4 by the occurrence of the PII node "DOB" in graph $457_{STEP3}$. Since the name node "John" and the alias node "Our CEO" have been deemed to refer to the same person (e.g., due to the PII-in-common), it can be inferred that the PII "DOB" is also shared in common by the person known as "John", who has been deemed to be the same person as the person being referred to as "Our CEO".

It can happen that any name or alias node has additional PII associated with the name or alias. This is shown in FIG. 4B5. Specially, the graph $457_{STEP4}$ shows PII nodes labeled as "Other PII". Since the name "John" and the alias "Our CEO" have been deemed to refer to the same person, then the other PII of "John" can be associated with "Our CEO". Also, since the name "John" and the alias "Our CEO" have been deemed to refer to the same person, then the other PII of "Our CEO" can be associated with "John". Edges can be defined to record the foregoing associations. Alternatively, or additionally, a graph such as graph $457_{STEP4}$, can be traversed at any time so as to identify all of the then-current PII for any name or alias.

FIG. 5A and FIG. 5B depict an example entity graph augmentation technique 500 as used in systems that produce coreference-resolved mappings of persons to personally identifiable information. As an option, one or more variations of entity graph augmentation technique 500 or any aspect thereof may be implemented in the context of the architecture and functionality of the embodiments described herein and/or in any in any environment.

FIG. 5A and FIG. 5B illustrate aspects pertaining to mapping persons to respective PII discovered over a corpus of content objects by correlating the PII to coreferenced entities contained in the context associated with the personally identifiable information. Specifically, the figures are presented to illustrate one embodiment of certain steps and/or operations that facilitate assessing the context associated with the discovered PII to augment the entity graph with interrelations between the PII with coreferenced entities derived from the context. A representative scenario is also shown in the figure to illustrate an example application of example entity graph augmentation technique 500.

Referring to FIG. 5A, the example entity graph augmentation technique 500 commences by enumerating instances of PII from an entity graph to assess for their interrelations with persons (step 502). As described herein, entity graphs 108 may include an entity graph that comprises PII-to-content object associations, but not PII-to-entity associations. In this case, the instances of PII (e.g., PII nodes) of this entity graph might be desired to be further assessed. The content objects associated with the instance of PII are determined (step 504). As illustrated, entity graphs 108 may be queried to extract a set of PII-object pairs 532 that include a first pair comprising file 420 and PII instance $105_3$ and a second pair comprising file 420 and PII instance $105_4$.

For each PII-object pair, the content object of the pair is analyzed to identify one or more passages that represent the context of the PII of the pair (step 506). File 420, for example, has a PII context $106_3$ that corresponds to PII instance $105_3$ and a PII context $106_4$ that corresponds to PII instance $105_4$. Specifically illustrated is an example passage 534 that represents the PII context $106_4$.

According to example entity graph augmentation technique 500, the passages that represent the context of the PII of the PII-object pair are partitioned into linguistic expressions (step 508). The linguistic expressions are then classified to identify a set of entity expressions that refer to persons (step 510). Such entity expressions may include proper names, pronouns, titles, and/or expressions that refer to a person. In example passage 534, the entity expressions "John Smith" and "CEO" are identified. Links between the entity expressions are established based at least in part on binding scores that respectively correspond to the links (step 512).

For example, based at least in part on the structure of example passage 534 and/or other information, a link between "John Smith" and "CEO" that indicates they refer to the same person may be established. Specifically, and as shown in a set of representative links 536 derived from example passage 534, a first link and a second link between "John Smith" and "CEO" having a BS=4 (e.g., above average binding strength) and a BS=2 (e.g., below average binding strength), respectively, are established. The first link has a higher BS as it is tightly bound in the sentence "John Smith is the CEO". The second link has a lower BS since that instance of "CEO" may refer to someone other than "John Smith".

As can be observed, step 506, step 508, step 510, and step 512 may be performed to achieve a coreference resolution 537. The entity expressions from the PII context are also mapped to the PII instance of the PII-object pair, based at least in part on respective mapping scores (MS) (step 514). As depicted in representative links 536, "CEO" is mapped to the corresponding PII (e.g., SSN of 123-45-6789) with a MS=5 (e.g., high mapping strength). The flow continues from the bottom of FIG. 5A to the top of FIG. 5B.

Referring to FIG. 5B, the entity graph is assessed to compare the entity expressions to existing nodes in the entity graph (step 516). In some cases, one or more of the entity expressions may already be recorded as nodes in the entity graph. If there are any new entity expressions to add ("Yes" path of decision 518), the new entity expressions are recorded as respective nodes in the entity graph (step 520). As indicated in a set of select node data $382_3$, node N3 and node N4 record the entity expressions "CEO" and "John Smith", respectively. When the new entity expressions are recorded or there are no new entity expressions to record ("No" path of decision 518), the associations between the entity expressions and the PII are recorded as edges in the entity graph (step 522). The binding scores, mapping scores, and/or other attributes are assigned to edges of the aforementioned associations between the entity expressions and the PII (step 524).

As shown, the set of select node relationship data $386_3$ records an entity-PII association 538 between "CEO" (node N3) and SSN "123-45-6789" (node N2) and an entity-entity association 539 between "CEO" (node N3) and "John Smith" (node N4). The binding score (e.g., BS=3) of entity-entity association 539 is an average of the binding scores that correspond to the "CEO" and "John Smith" links in representative links 536 of FIG. 5A.

The foregoing discussions include techniques for performing operations over an entity graph to facilitate compliance with PII policies, rules, and/or preferences (e.g., step 208 of FIG. 2A and FIG. 2B), which techniques are disclosed in further detail as follows.

FIG. 6 presents a PII management technique 600 as used in systems that map particular persons to particular personally identifiable information. As an option, one or more variations of PII management technique 600 or any aspect thereof may be implemented in the context of the architecture and functionality of the embodiments described herein and/or in any in any environment.

FIG. 6 illustrates aspects pertaining to mapping persons to respective PII discovered over a corpus of content objects by correlating the PII to coreferenced entities contained in the context associated with the personally identifiable information. Specifically, the figure is presented to illustrate one embodiment of certain steps and/or operations that facilitate performing operations over an entity graph to facilitate compliance with PII policies, rules, and/or preferences. As depicted in the figure, the steps and/or operations are associated with step 208 of FIG. 2A and FIG. 2B. A representative scenario is also shown in the figure to illustrate an example application of PII management technique 600.

PII management technique 600 commences by receiving instructions to execute operations over a set of content objects that contain PII of a subject person (step 602). An entity graph is queried for all direct and indirect associations between the PII and the subject person (step 604). As illustrated in the accompanying scenario, a representative entity graph 380 from entity graphs 108 might be queried to discover PII associated with "John Smith". As can be observed in a set of select node relationship data $386_4$, a direct entity-PII association 634 (e.g., between "John Smith" and phone number 555-1234) and an indirect entity-PII association 632 (e.g., between "John Smith" and "CEO", and between "CEO" and SSN 123-45-6789) are identified.

The identified direct and indirect associations are ranked according to their respective scores (step 606) and analyzed to determine a set of high-confidence associations between the PII and the subject person (step 608). As an example, a weighted average (e.g., weighted by type) of the scores might be compared to a score threshold to classify an association as "high confidence". The entity graph is then queried to determine a set of content objects that comprise the PII corresponding to all high-confidence associations (step 610). In the accompanying scenario, representative entity graph 380 is queried to determine the content object(s) associated with the PII corresponding to node N2 and node N5, or file "f420" and file "f785", respectively. The content objects are then presented to facilitate execution of the operation (step 612).

As shown in a set of representative query results 636, the foregoing file names are listed with the types of PII (e.g., "InfoTypes" such as SSN and CCN) as may be discovered in the files. This information can be presented to a user (e.g., system administrator) and/or a system agent to perform various PII management tasks over the content objects. Strictly as examples, the foregoing PII management tasks over the content objects can include (1) deleting a person's account and all PII of that person, regardless of the provenance of the PII, and/or (2) expunging or redacting any PII from anywhere in the content management system, and/or (3) changing retention rules on certain content objects that contain PII of the person of interest, and/or (4) archiving and/or applying security controls (e.g., labels and/or permissions), and/or (5) enforcing zone-specific and/or jurisdiction-specific governance rules over the identified content objects that contain PII of the person of interest.

Additional Embodiments of the Disclosure

Instruction Code Examples

Figure 7A:
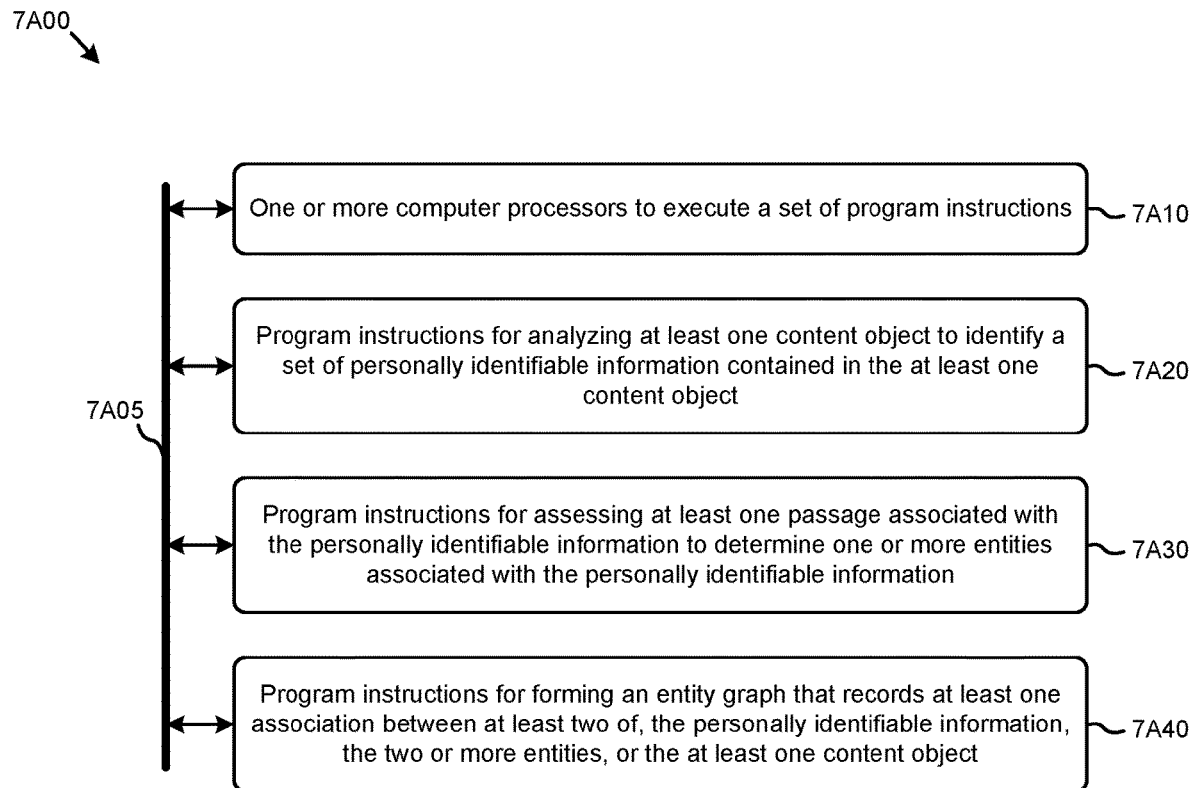
FIG. 7A, FIG. 7B, and FIG. 7C depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address managing personally identifiable information pertaining to known and unknown persons that is embedded across arbitrary corpora of content objects. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: analyzing at least one content object to identify a set of personally identifiable information contained in the at least one content object (module 7A20); assessing at least one passage associated with the personally identifiable information to determine two or more entities associated with the personally identifiable information (module 7A30); and forming an entity graph that records at least one association between at least two of, the personally identifiable information, the two or more entities, or the at least one content object (module 7A40).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
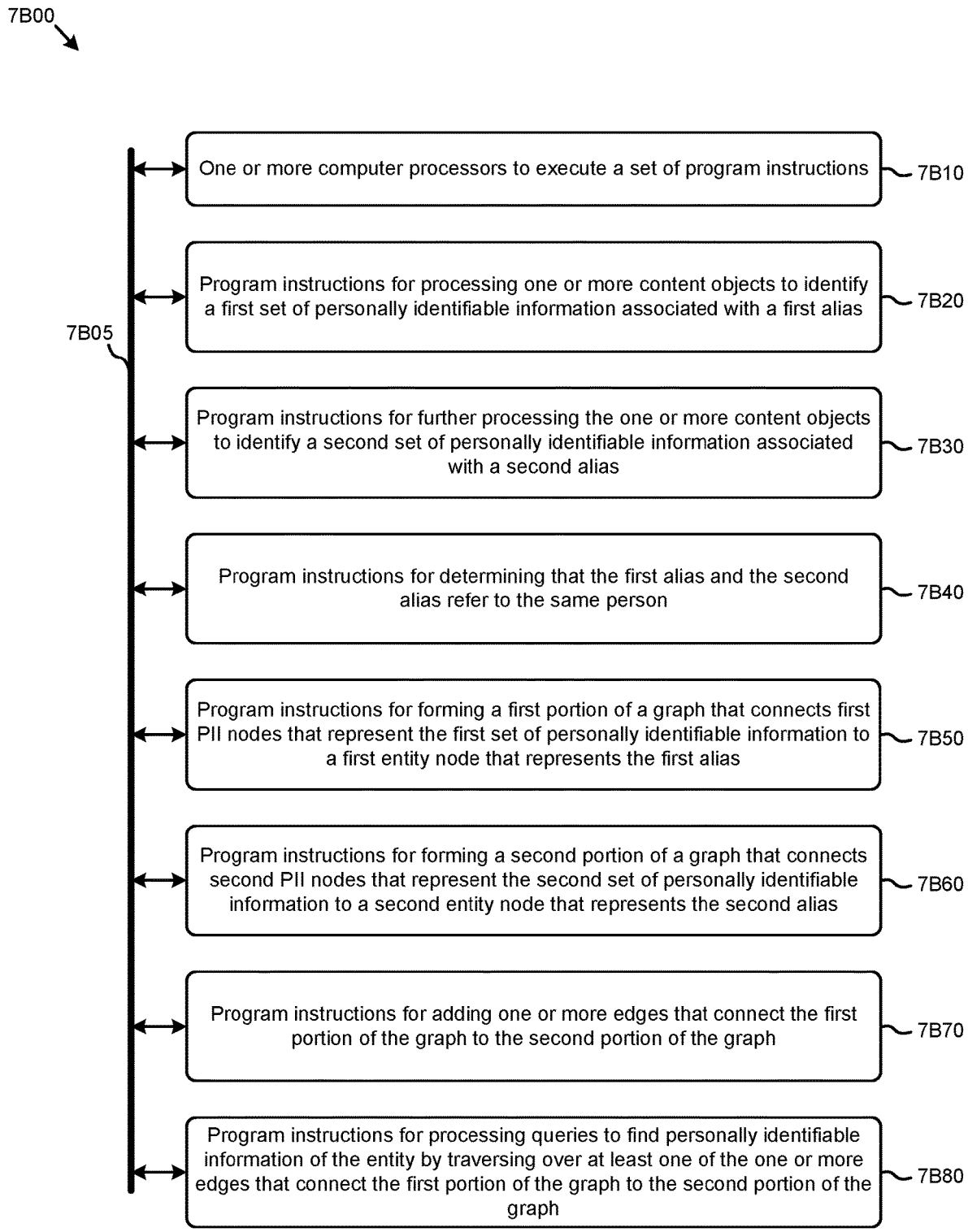

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. FIG. 7B depicts a block diagram of a system to perform certain functions of a computer system. As an option, the system 7B00 may be implemented in the context of the architecture and functionality of the embodiments described herein. Of course, however, the system 7B00 or any operation therein may be carried out in any desired environment. The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims. The shown embodiment implements a portion of a computer system, presented as system 7B00, comprising one or more computer processors to execute a set of program code instructions (module 7B10) and modules for accessing memory to hold program code instructions to perform: processing one or more content objects to identify a first set of personally identifiable information associated with a first alias (module 7B20); further processing the one or more content objects to identify a second set of personally identifiable information associated with a second alias (module 7B30); determining that the first alias and the second alias refer to the same person (module 7B40); forming a first portion of a graph that connects first PII nodes that represent the first set of personally identifiable information to a first entity node that represents the first alias (module 7B50); forming a second portion of a graph that connects second PII nodes that represent the second set of personally identifiable information to a second entity node that represents the second alias (module 7B60); adding one or more edges that connect the first portion of the graph to the second portion of the graph (module 7B70); and processing queries to find personally identifiable information of the entity by traversing over at least one of the one or more edges that connect the first portion of the graph to the second portion of the graph (module 7B80).

Figure 7C:
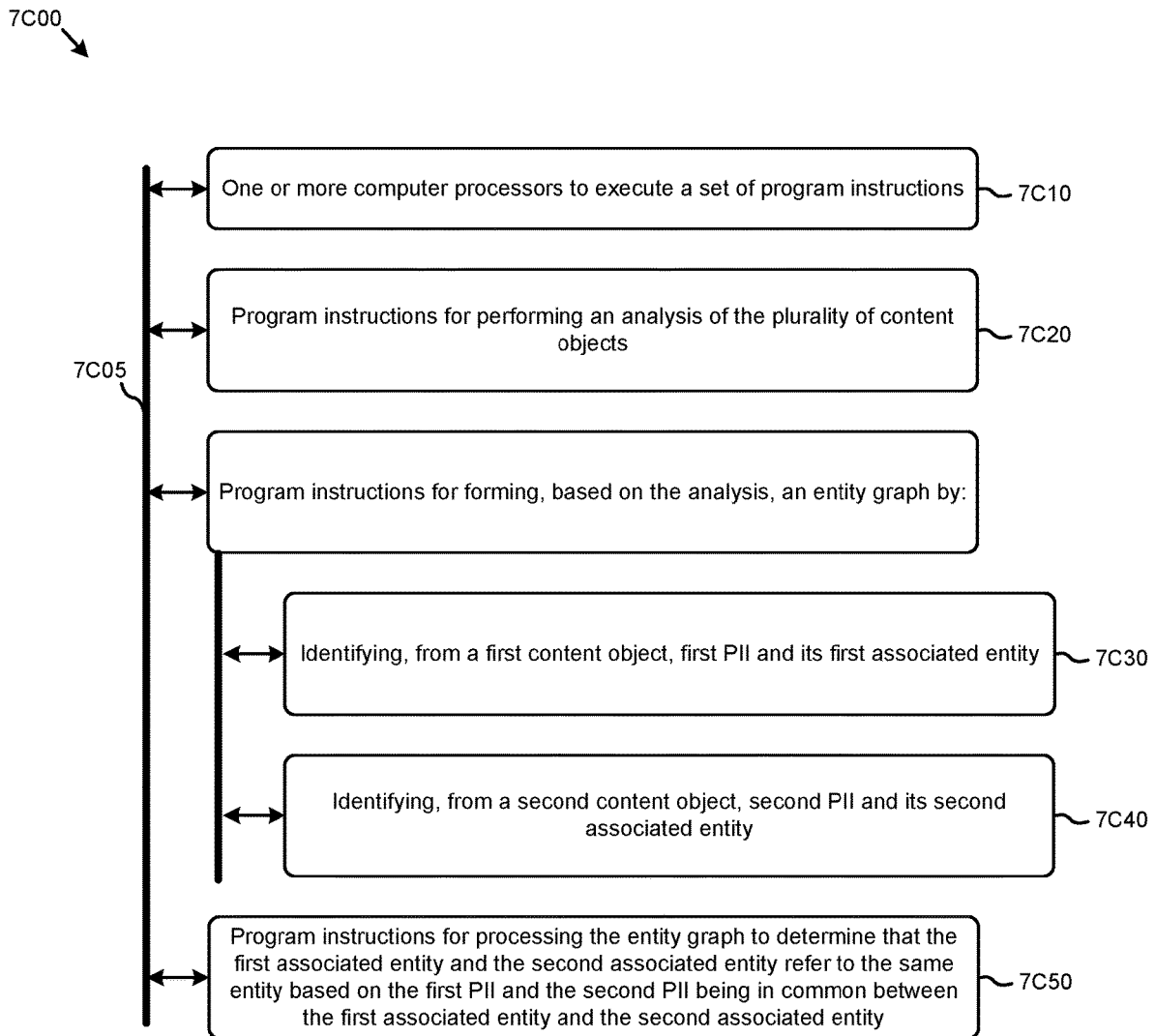

FIG. 7C depicts a system 7C00 as an arrangement of computing modules that are interconnected so as to operate cooperatively to implement certain of the herein-disclosed embodiments. The partitioning of system 7C00 is merely illustrative and other partitions are possible. FIG. 7C depicts a block diagram of a system to perform certain functions of a computer system. As an option, the system 7C00 may be implemented in the context of the architecture and functionality of the embodiments described herein. Of course, however, the system 7C00 or any operation therein may be carried out in any desired environment. The system 7C00 comprises at least one processor and at least one memory, the memory serving to store program instructions corresponding to the operations of the system. As shown, an operation can be implemented in whole or in part using program instructions accessible by a module. The modules are connected to a communication path 7C05, and any operation can communicate with any other operations over communication path 7C05. The modules of the system can, individually or in combination, perform method operations within system 7C00. Any operations performed within system 7C00 may be performed in any order unless as may be specified in the claims. The shown embodiment implements a portion of a computer system, presented as system 7C00, comprising one or more computer processors to execute a set of program code instructions (module 7C10) and modules for accessing memory to hold program code instructions to perform an analysis of the plurality of content objects (module 7C20); forming, based on the analysis, an entity graph by (1) identifying, from a first content object, first PII and its first associated entity (module 7C30); and then (2) identifying, from a second content object, second PII and its second associated entity (module 7C40). The entity graph can be traversed and/or otherwise processed to determine that the first associated entity and the second associated entity refer to the same entity based on the first PII and the second PII being in common between the first associated entity and the second associated entity (module 7C50).

System Architecture Overview

Additional System Architecture Examples

Figure 8A:
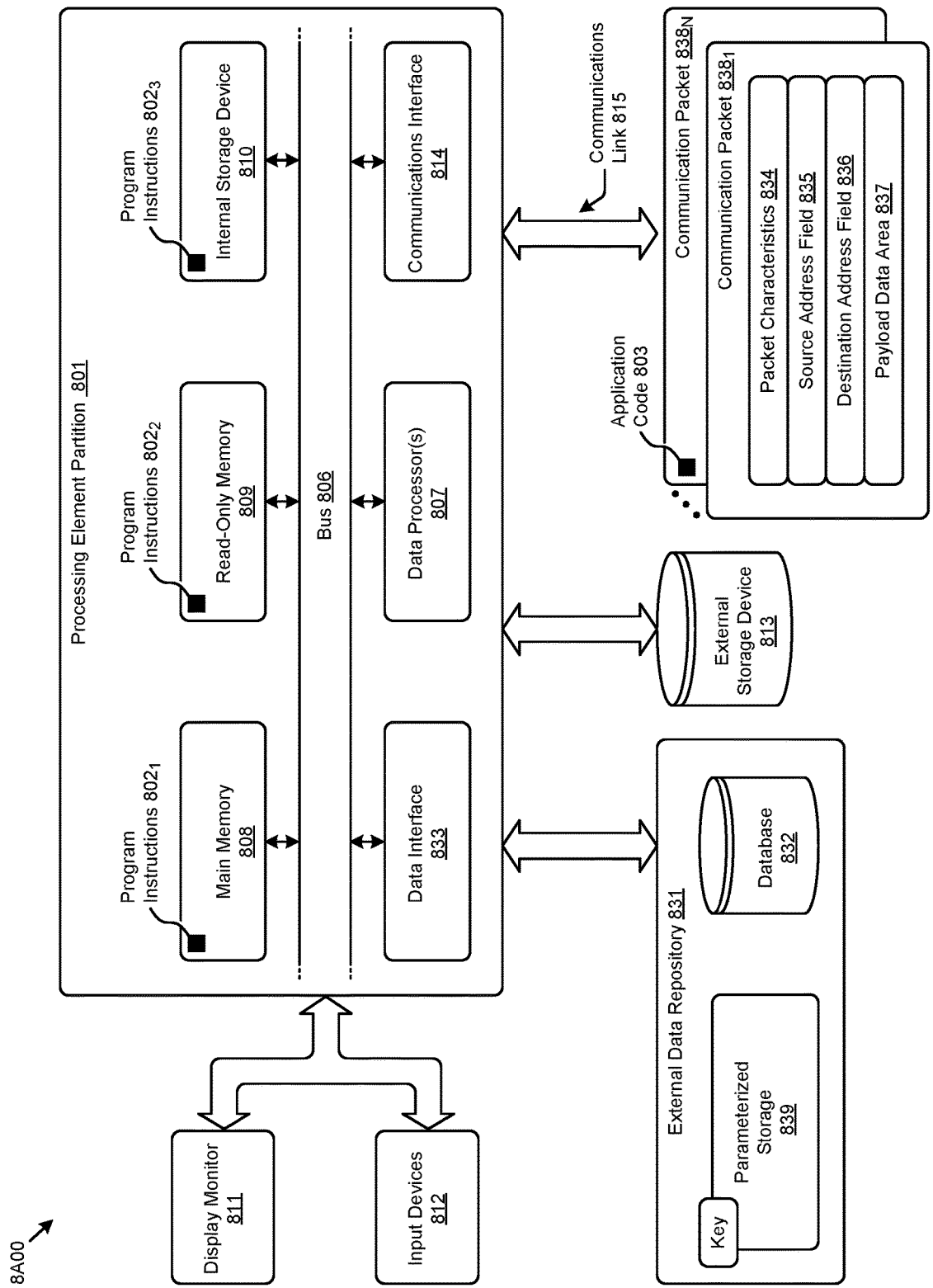
FIG. 8A and FIG. 8B present block diagrams of computer system architectures having components suitable for implementing embodiments of the present disclosure and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program instructions may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to coreference-resolved mapping of persons to personally identifiable information. A module may include one or more state machines and/or combinational logic used to implement or facilitate the operational and/or performance characteristics pertaining to coreference-resolved mapping of persons to personally identifiable information.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of coreference-resolved mapping of persons to personally identifiable information). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to coreference-resolved mapping of persons to personally identifiable information, and/or for improving the way data is manipulated when performing computerized operations pertaining to mapping persons to respective PII discovered over a corpus of content objects by correlating the PII to coreferenced entities contained in the context associated with the personally identifiable information.

Figure 8B:
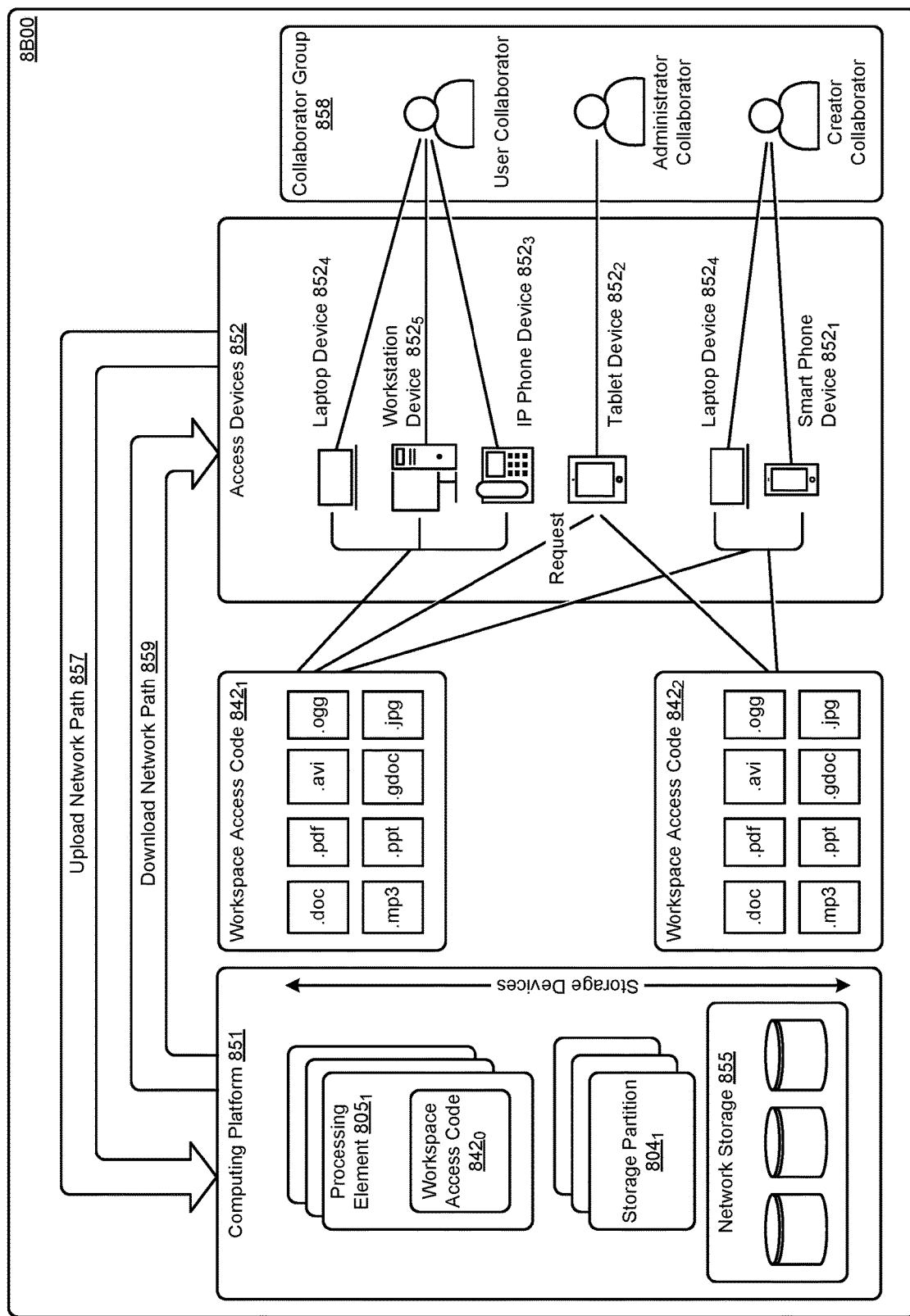

FIG. 8B depicts a block diagram of an instance of a cloud-based environment 8B00. Such a cloud-based environment supports access to workspaces through the execution of workspace access code (e.g., workspace access code 842o, workspace access code 842₁, and workspace access code 842₂). Workspace access code can be executed on any of access devices 852 (e.g., laptop device 852₄, workstation device 852₅, IP phone device 852₃, tablet device 852₂, smart phone device 852₁, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element 805₁). The workspace access code can interface with storage devices such as networked storage 855. Storage of workspaces and/or any constituent files or objects, and/or any other code or scripts or data can be stored in any one or more storage partitions (e.g., storage partition 804₁). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for associating personally identifiable (PII) information to an entity and the entity's aliases, the method comprising:

processing one or more content objects to identify a first set of personally identifiable information associated with a first alias;

further processing the one or more content objects to identify a second set of personally identifiable information associated with a second alias;

forming a first portion of a graph at least by populating the first portion with first PII nodes and a first entity node and further by connecting the first PII nodes with the first entity node, wherein the first PII nodes and the first entity node are determined from the one or more content objects to respectively represent the first set of personally identifiable information and the first alias;

forming a second portion of the graph at least by populating the second portion with one or more second PII nodes and a second entity node and further by connecting the second PII nodes with the second entity node, wherein the second PII nodes and the second entity node are determined from the one or more content objects to respectively represent the second set of personally identifiable information and the second alias, and the first portion and the second portion are disconnected from each other in the graph;

augmenting the graph at least by adding one or more edges that connect at least the first entity node or a first PII node in the first portion of the graph to the second entity node in the second portion of the graph; and processing a query to find personally identifiable information of the entity by traversing over at least one of the one or more edges added to the graph.

2. The method of claim 1, further comprising:

querying the graph, with a name of a person, wherein results of the query comprises (1) a first item of personally identifiable information of the person, and (2) a different item of personally identifiable information of an alias correlated with the person.

3. The method of claim 1, further comprising:

querying the graph, with a person of interest's alias, wherein results of the query comprises (1) a first item of personally identifiable information corresponding to the person of interest's alias, and (2) a different item of personally identifiable information of the person of interest.

4. The method of claim 1, further comprising querying the graph to determine a subject content object that includes at least one of (1) a first item of the first set of personally identifiable information of a person, and (2) a second item of the second set of personally identifiable information of an alias correlated with the person.

5. The method of claim 4, further comprising modifying the subject content object to eliminate occurrences of (1) the first item of the first set of personally identifiable information of the person, and (2) the second item of the second set of personally identifiable information of the alias.

6. The method of claim 1, wherein at least one item of the first set of personally identifiable information is identified, based at least in part on a PII detection rule.

7. The method of claim 1, wherein at least one item of the first set of personally identifiable information is identified, based at least in part on identification of pronominal anaphoric references.

8. The method of claim 7, wherein the pronominal anaphoric references are taken from context of a PII instance.

9. The method of claim 1 wherein a database is accessed to determine that the first alias and the second alias refer to the same person.

10. The method of claim 9 wherein the database is accessed using a lightweight directory access protocol (LDAP).

11. A non-transitory computer readable medium having stored thereon a sequence of instructions which, when stored in memory and executed by one or more processors causes the one or more processors to perform a set of acts for associating personally identifiable (PII) information to an entity and the entity's aliases, the set of acts comprising:

processing one or more content objects to identify a first set of personally identifiable information associated with a first alias;

further processing the one or more content objects to identify a second set of personally identifiable information associated with a second alias;

forming a first portion of a graph at least by populating the first portion with first PII nodes and a first entity node and further by connecting the first PII nodes with the first entity node, wherein the first PII nodes and the first entity node are determined from the one or more content objects to respectively represent the first set of personally identifiable information and the first alias;

forming a second portion of the graph at least by populating the second portion with one or more second PII nodes and a second entity node and further by connecting the second PII nodes with the second entity node, wherein the second PII nodes and the second entity node are determined from the one or more content objects to respectively represent the second set of personally identifiable information and the second alias, and the first portion and the second portion are disconnected from each other in the graph;

augmenting the graph at least by adding one or more edges that connect at least the first entity node or a first PII node in the first portion of the graph to the second entity node in the second portion of the graph; and processing a query to find personally identifiable information of the entity by traversing over at least one of the one or more edges added to the graph.

12. The non-transitory computer readable medium of claim 11, further comprising instructions which, when stored in memory and executed by the one or more processors causes the one or more processors to perform acts of:

querying the graph, with a name of a person, wherein results of the query comprises (1) a first item of personally identifiable information of the person, and (2) a different item of personally identifiable information of an alias correlated with the person.

13. The non-transitory computer readable medium of claim 11, further comprising instructions which, when stored in memory and executed by the one or more processors causes the one or more processors to perform acts of:

querying the graph, with a person of interest's alias, wherein results of the query comprises (1) a first item of personally identifiable information corresponding to the person of interest's alias, and (2) a different item of personally identifiable information of the person of interest.

14. The non-transitory computer readable medium of claim 11, further comprising instructions which, when stored in memory and executed by the one or more processors causes the one or more processors to perform acts of querying the graph to determine a subject content object that includes at least one of (1) a first item of the first set of personally identifiable information of a person, and (2) a second item of the second set of personally identifiable information of an alias correlated with the person.

15. The non-transitory computer readable medium of claim 14, further comprising instructions which, when stored in memory and executed by the one or more processors causes the one or more processors to perform acts of modifying the subject content object to eliminate occurrences of (1) the first item of the first set of personally identifiable information of the person, and (2) the second item of the second set of personally identifiable information of an alias referring to the person.

16. The non-transitory computer readable medium of claim 11, wherein at least one item of the first set of personally identifiable information is identified, based at least in part on a PII detection rule.

17. The non-transitory computer readable medium of claim 11, wherein at least one item of the first set of personally identifiable information is identified, based at least in part on identification of pronominal anaphoric references.

18. The non-transitory computer readable medium of claim 17, wherein the pronominal anaphoric references are taken from context of a PII instance.

19. A system for associating personally identifiable (PII) information to an entity and the entity's aliases, the system comprising:

a storage medium having stored thereon a sequence of instructions; and one or more processors that execute the sequence of instructions to cause the one or more processors to perform a set of acts, the set of acts comprising, processing one or more content objects to identify a first set of personally identifiable information associated with a first alias;

further processing the one or more content objects to identify a second set of personally identifiable information associated with a second alias;

forming a first portion of a graph at least by populating the first portion with first PII nodes and a first entity node and further by connecting the first PII nodes with the first entity node, wherein the first PII nodes and the first entity node are determined from the one or more content objects to respectively represent the first set of personally identifiable information and the first alias;

forming a second portion of the graph at least by populating the second portion with one or more second PII nodes and a second entity node and further by connecting the second PII nodes with the second entity node, wherein the second PII nodes and the second entity node are determined from the one or more content objects to respectively represent the second set of personally identifiable information and the second alias, and the first portion and the second portion are disconnected from each other in the graph;

augmenting the graph at least by adding one or more edges that connect at least the first entity node or a first PII node in the first portion of the graph to the second entity node in the second portion of the graph; and processing a query to find personally identifiable information of the entity by traversing over at least one of the one or more edges.

20. The system of claim 19, further comprising:

querying the graph, with a name of a person, wherein results of the query comprises (1) a first item of personally identifiable information of the person, and (2) a different item of personally identifiable information of an alias referring to the person.

* * * * *